(12) United States Patent
Lu et al.

(10) Patent No.: US 12,334,030 B2
(45) Date of Patent: Jun. 17, 2025

(54) DISPLAY DEVICE AND DRIVING METHOD

(71) Applicant: BOE Technology Group Co., Ltd., Beijing (CN)

(72) Inventors: Meirong Lu, Beijing (CN); Weixing Liu, Beijing (CN); Chunfang Zhang, Beijing (CN); Wanpeng Teng, Beijing (CN); Kai Guo, Beijing (CN); Zhiqiang Xu, Beijing (CN); Jintao Peng, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/294,153

(22) PCT Filed: Feb. 28, 2023

(86) PCT No.: PCT/CN2023/078784
§ 371 (c)(1),
(2) Date: Jan. 31, 2024

(87) PCT Pub. No.: WO2024/178619
PCT Pub. Date: Sep. 6, 2024

(65) Prior Publication Data
US 2024/0428747 A1      Dec. 26, 2024

(51) Int. Cl.
*G09G 3/34* (2006.01)

(52) U.S. Cl.
CPC ... *G09G 3/3446* (2013.01); *G09G 2300/0426* (2013.01); *G09G 2310/08* (2013.01); *G09G 2320/0271* (2013.01)

(58) Field of Classification Search
CPC ......... G09G 3/3446; G09G 2300/0426; G09G 2310/08; G09G 2320/0271; G02F 1/1676; G02F 1/16762; G02F 1/165
See application file for complete search history.

(56) References Cited

U.S. PATENT DOCUMENTS

| | | | |
|---|---|---|---|
| 2006/0192751 A1* | 8/2006 | Miyasaka | G09G 3/344 345/107 |
| 2007/0057905 A1* | 3/2007 | Johnson | G09G 3/344 345/107 |
| 2009/0237392 A1* | 9/2009 | Kajino | G09G 3/344 345/107 |
| 2010/0201657 A1* | 8/2010 | Miyazaki | G02F 1/167 345/205 |
| 2011/0254816 A1* | 10/2011 | Umezaki | G09G 3/344 345/204 |
| 2012/0069425 A1* | 3/2012 | Sato | G02F 1/167 359/296 |
| 2017/0337879 A1* | 11/2017 | Oishi | G02F 1/1368 |

* cited by examiner

Primary Examiner — Amy Onyekaba
(74) Attorney, Agent, or Firm — Ling Wu; Stephen Yang; Ling and Yang Intellectual Property

(57) ABSTRACT

Embodiments of the present disclosure provide a display device and a driving method. The display device includes a display panel that includes a plurality of pixels, each of the plurality of pixels includes a pixel electrode, wherein the pixel electrode includes a plurality of pixel sub-electrodes spaced from each other; and a drive circuit configured to load a first drive voltage with different maintaining durations to at least part of a plurality of pixel sub-electrodes in a set pixel through a signal output terminal in a picture display stage, so that the set pixel is switched from a first state to a second state; wherein the set pixel is at least one of the plurality of pixels.

20 Claims, 16 Drawing Sheets

DISPLAY DEVICE AND DRIVING METHOD

CROSS-REFERENCE TO RELATED APPLICATION

The present application is a U.S. National Phase Entry of International Application No. PCT/CN2023/078784 having an international filing date of Feb. 28, 2023, the content of which is hereby incorporated by reference.

TECHNICAL FIELD

The present disclosure relates to the field of display technologies, in particular to a display device and a driving method.

BACKGROUND

Electronic paper display products have the effects of eye protection and power saving, thus receiving widespread attention. A non-capsule electrophoretic display structure thereof has advantages of an improved reflectivity, reduced response time, an improved gray scale capability and the like.

An electrophoretic liquid layer is formed on a surface of a back plate of the non-capsule electrophoretic display structure, and then the electrophoretic liquid layer is covered by an upper glass substrate by vacuum cell aligning. The electrophoretic liquid in the electrophoretic liquid layer includes electrophoretic particles with different colors. By controlling electrodes on both sides of the electrophoretic liquid layer to generate a vertical electric field, an aggregation degree of the electrophoretic particles with different colors at a bottom and a top of the cell can be adjusted to achieve different gray scales.

SUMMARY

A display device is provided in an embodiment of the present disclosure, including:
  a display panel, including a plurality of pixels, wherein each of the plurality of pixels includes a pixel electrode, and the pixel electrode includes a plurality of pixel sub-electrodes spaced from each other; and
  a drive circuit, configured to load first drive voltages with different maintaining durations to at least part of a plurality of pixel sub-electrodes in a set pixel through a signal output terminal in a picture display stage, so that the set pixel is switched from a first state to a second state; wherein the set pixel is at least one of the plurality of pixels.

In some possible implementations, the drive circuit is further configured to load first drive voltages with different maintaining durations to at least part of the plurality of pixel sub-electrodes in the set pixel through the signal output terminal while the second state is maintained, in the picture display stage.

In some possible implementations, a plurality of pixel sub-electrodes of the pixel electrode are divided into a plurality of sub-electrode groups, wherein a sub-electrode group includes at least one pixel sub-electrode; the pixel electrodes has a symmetry axis in a column direction of pixels, and the sub-electrode groups in the pixel electrode are symmetrical about the symmetry axis; the sub-electrode groups are divided into N drive units, each of the drive units includes two sub-electrode groups disposed symmetrically.

In some possible implementations, the drive circuit is further configured to load a first drive voltage with a same maintaining duration to sub-electrode groups in a same drive unit, and load the first drive voltage with different maintaining durations to sub-electrode groups in different drive units, in the set pixel.

In some possible implementations, the N drive units are defined as a first drive unit to an N-th drive unit in a direction from a drive unit close to the symmetry axis to a drive unit away from the symmetry axis; and
  the drive circuit is further configured to sequentially increase maintaining durations of first drive voltages loaded from the first drive unit to the N-th drive unit in the set pixel.

In some possible implementations, there are a plurality of drive circuits, wherein each column of pixels corresponds to N drive circuits of the plurality of drive circuits;
  the pixel further includes N switch control circuits; an n-th drive unit of each column of pixels is coupled to a signal output terminal of an n-th drive circuit of the N drive circuits by an n-th switch control circuit of the N switch control circuits;
  the switch control circuit is configured to make a signal output terminal of a corresponding drive circuit be conductive with a corresponding drive unit under control of a signal at a scanning signal terminal.

In some possible implementations, the drive circuit includes a first control sub-circuit, a second control sub-circuit and a third control sub-circuit;
  the first control sub-circuit is coupled to a first node and configured to provide a signal of a first power supply terminal to the first node when a data voltage at a data input terminal is higher than a set voltage, and to provide a signal of a second power supply terminal to the first node when the data voltage at the data input terminal is lower than the set voltage;
  the second control sub-circuit is coupled to a second node and configured to provide a signal of a first ramp signal terminal to the second node when the data voltage at the data input terminal is higher than the set voltage, and to provide a signal of a second ramp signal terminal to the second node when the data voltage at the data input terminal is lower than the set voltage; and
  the third control sub-circuit is coupled to the first node and the second node, and is configured to output the first drive voltage to the signal output terminal according to the data voltage at the data input terminal, a voltage of a signal of the first node, and a voltage of a signal of the second node.

In some possible implementations, the first control sub-circuit includes a first transistor and a second transistor;
  a gate of the first transistor is coupled to the data input terminal, a first electrode of the first transistor is coupled to the first power supply terminal, and a second electrode of the first transistor is coupled to the first node; and
  a gate of the second transistor is coupled to the data input terminal, a first electrode of the second transistor is coupled to the first node, and a second electrode of the second transistor is coupled to the second power supply terminal.

In some possible implementations, the second control sub-circuit includes a third transistor and a fourth transistor;
  a gate of the third transistor is coupled to the data input terminal, a first electrode of the third transistor is coupled to the first ramp signal terminal, and a second electrode of the third transistor is coupled to the second node; and a gate of the fourth transistor is coupled to the data input terminal, a first electrode of the fourth transistor is coupled to the second node, and a second electrode of the fourth transistor is coupled to the second ramp signal terminal.

In some possible implementations, the third control sub-circuit includes a comparator;

a first input terminal of the comparator is coupled to the data signal terminal, a second input terminal of the comparator is coupled to the second node, a third input terminal of the comparator is coupled to the first node, a fourth input terminal of the comparator is coupled to a ground terminal, and an output terminal of the comparator is coupled to the signal output terminal.

In some possible implementations, the switch control circuit includes a conducting transistor;

a gate of the conducting transistor is coupled to the scanning signal terminal, a first electrode of the conducting transistor is coupled to the signal output terminal, and a second electrode of the conducting transistor is coupled to the drive unit.

In some possible implementations, the switch control circuit further includes a capacitor;

a first electrode of the capacitor is coupled to the second electrode of the conducting transistor, and a second electrode of the capacitor is coupled to the ground terminal.

In some possible implementations, the display panel further includes a plurality of scanning signal lines and a plurality of data signal lines;

a scanning signal terminal of a switch control circuit in each row of pixels is coupled to one of the plurality of scanning signal lines; and an n-th switch control circuit in each column of pixels is coupled to a signal output terminal of an n-th drive circuit through one of the plurality of data signal lines.

In some possible implementations, the pixel electrodes include an even number of sub-electrode groups;

or the pixel electrodes include an odd number of sub-electrode groups, wherein the pixel further includes an (N+1)-th switch control circuit, and each column of pixels further corresponds to an (N+1)-th drive circuit of the plurality of drive circuits; in each column of pixels, a sub-electrode group on the symmetry axis SZ is coupled to the (N+1)-th drive circuit through the (N+1)-th switch control circuit; a maintaining duration of a first drive voltage corresponding to a sub-electrode group on the symmetry axis SZ is smaller than the maintaining duration of the first drive voltage corresponding to the first drive unit.

In some possible implementations, the drive circuit is further configured to in the picture display stage, load a second drive voltage with a same maintaining duration to the plurality of pixel sub-electrodes in the set pixel through the signal output terminal, to switch the set pixel from the second state to the first state.

In some possible embodiments, the display panel is an electronic paper display panel, and the display panel further includes a first base substrate;

each of the plurality of pixels further includes:
a common electrode located on a side of the pixel electrode away from the first base substrate; and an electrophoretic liquid layer located between the pixel electrode and the common electrode, wherein the electrophoretic liquid layer includes a plurality of charged particles;

wherein the pixel sub-electrode is configured to drive the plurality of charged particles to adjust gray scale display.

A method for driving a display device is further provided in an embodiment of the present disclosure, which includes the following acts:

loading a first drive voltage with different maintaining durations to at least part of a plurality of pixel sub-electrodes in a set pixel through a signal output terminal in a picture display stage, to switch the set pixel from a first state to a second state; wherein the set pixel is at least one of the plurality of pixels.

In some possible implementations, the method further includes loading first drive voltages with different maintaining durations to at least part of the plurality of pixel sub-electrodes in the in set pixel through the signal output terminal when the second state is maintained, in the picture display stage.

In some possible implementations, the method further includes loading a second drive voltage with a same maintaining duration to the plurality of pixel sub-electrodes in the set pixel through the signal output terminal, to switch the set pixel from the second state to the first state.

DETAILED DESCRIPTION

Figure 1:
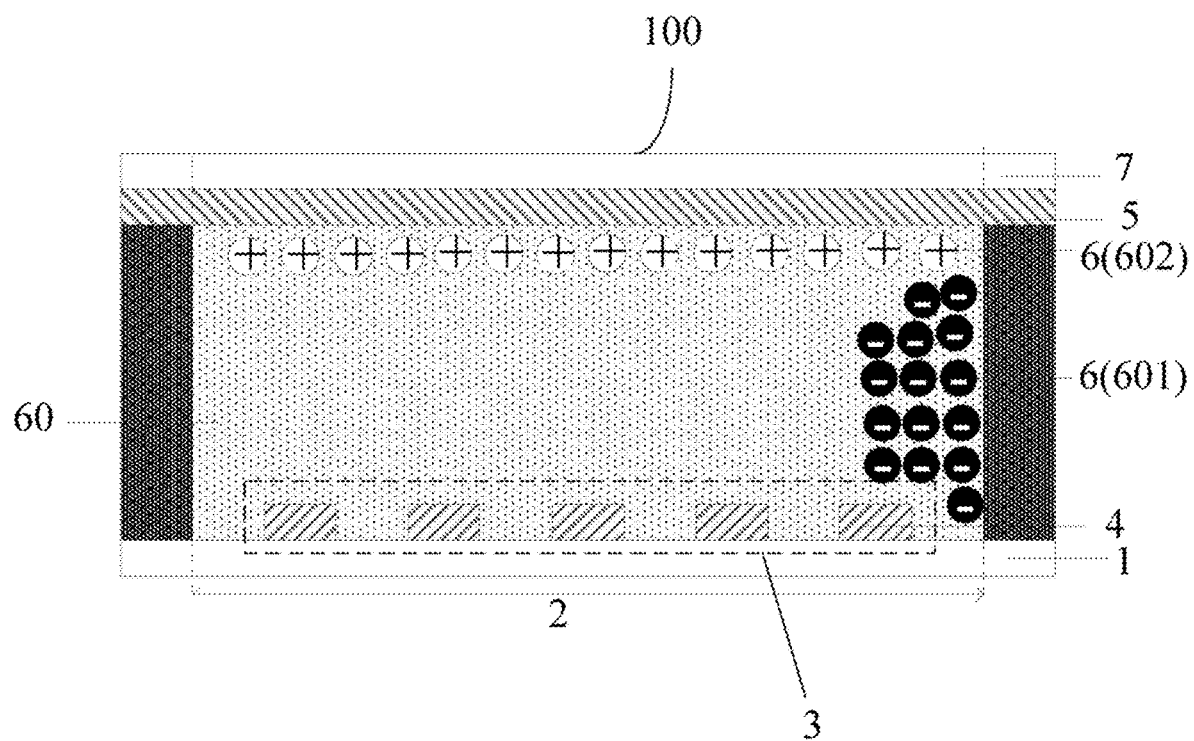
FIG. 1 is a schematic diagram of a structure of some display panels according to an embodiment of the present disclosure.

In order to make objectives, technical solutions and advantages of the embodiments of the present disclosure more clear, the technical solutions of the embodiments of the present disclosure will be clearly and completely described below with reference to the drawings of the embodiments of the present disclosure. Apparently, the described embodiments are a part of the embodiments of the present disclosure, not all of the embodiments. Furthermore, the embodiments of the present disclosure and features in the embodiments may be combined randomly with each other if there is no contradiction. Based on the described embodiments of the present disclosure, all other embodiments obtained by those of ordinary skills in the art without paying any inventive effort are within the protection scope of the present disclosure.

Unless otherwise defined, technical terms or scientific terms used in the present disclosure should have the meanings as commonly understood by those of ordinary skills in the art that the present disclosure belongs to. The "first", "second" and similar terms used in the present disclosure do not indicate any order, quantity, or importance, but are used only for distinguishing different components. "Include", "contain", or similar words mean that elements or objects appearing before the words cover elements or objects listed after the words and their equivalents, but do not exclude other elements or objects. "Connect", "couple", or a similar term is not limited to a physical or mechanical connection, but may include an electrical connection, whether direct or indirect.

It should be noted that sizes and shapes of various figures in the drawings do not reflect real proportions, and are only for the purpose of schematically illustrating contents of the present disclosure. Moreover, the same or similar elements and the elements having same or similar functions are denoted by same or similar reference numerals throughout the description.

A display device is provided in an embodiment of the present disclosure, which includes a display panel 100. As shown in FIG. 1, the display panel 100 includes a first base substrate 1 and a plurality of pixels 2 located on a side of the first base substrate 1. Each pixel 2 of the plurality of pixels 2 includes: a pixel electrode 3 including a plurality of pixel sub-electrodes 4 spaced from each other; a common electrode 5 located on a side of the pixel electrode 3 away from the first base substrate 1; and an electrophoretic liquid layer 60, located between the pixel electrode 3 and the common electrode 5 and including a plurality of charged particles 6.

In some embodiments of the present disclosure, the pixel electrode includes a plurality of pixel sub-electrodes spaced from each other. Since the plurality of pixel sub-electrodes are spaced from each other, drive voltages with different maintaining durations may be provided to the plurality of pixel sub-electrodes. Thus, electric fields with included angles greater than 0 degree between the electric fields and a direction perpendicular to the first base substrate can be formed between the plurality of pixel sub-electrodes, so that the electric fields generated by the plurality of pixel sub-electrodes may drive the charged particles to move along a direction parallel to a plane where the first base substrate is located, thereby an aggregation state of the charged particles in the direction parallel to the plane where the first base substrate is located may be changed by using the electric fields generated by the pixel sub-electrodes to adjust a gray scale. Compared with movement of charged particles driven by an electric field perpendicular to a direction of the first base substrate generated by the common electrode and the pixel electrode, the charged particles move in the direction parallel to the plane where the first base substrate is located, which can shorten a migration distance of the charged particles, and thus can reduce refresh time.

Thus, electric fields with included angles greater than 0 degree between the electric fields and a direction perpendicular to the first base substrate may be formed between the plurality of pixel sub-electrodes spaced from each other, so that the electric fields generated by the plurality of pixel sub-electrodes can drive the charged particles to move along the direction parallel to the plane where the first base substrate is located, thereby an aggregation state of the charged particles in the direction parallel to the plane where the first base substrate is located can be changed by using the electric fields generated by the pixel sub-electrodes, to adjust a gray scale.

In some embodiments of the present disclosure, as shown in FIG. 1, the display panel further includes a second base substrate 7 located on a side of the common electrode 5 away from the first base substrate 1.

In a specific implementation, for example, a pixel electrode may be formed on the first base substrate to obtain a first substrate; a common electrode is formed on the second base substrate to obtain a second base substrate; and the electrophoretic liquid layer is formed on a side of the first substrate, and then the second substrate covers the electrophoretic liquid layer by a vacuum cell aligning process, thereby obtaining the structure of the display panel according to the embodiment of the present disclosure.

In a specific implementation, common electrodes of different pixels are loaded with a same common electrode voltage, and each pixel presents a required gray scale by controlling the maintaining durations of the drive voltages loaded by the pixel electrodes to be not completely the same. Accordingly, in some embodiments, common electrodes of a plurality of pixels may be disposed to be integrally connected, that is, the common electrodes are a planar electrode disposed on a whole surface on a side of the second base substrate. In a specific implementation, the common electrode is a transparent electrode, for example, and a material of the common electrode includes Indium Tin Oxide (ITO for short).

Figure 2:
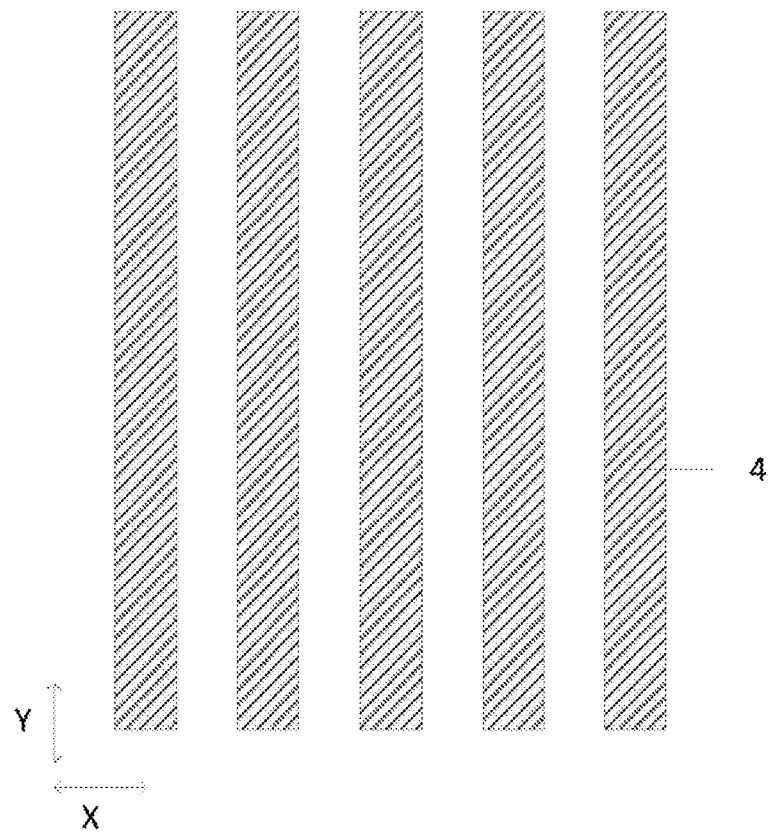
FIG. 2 is a schematic diagram of a structure of some pixel electrodes according to an embodiment of the present disclosure.

In some embodiments of the present disclosure, as shown in FIG. 2, the pixel sub-electrode 4 extends in a first direction Y, so that a pattern of the pixel electrode including a plurality of pixel sub-electrodes is simple, and fabrication difficulty of the pixel electrode can be simplified.

In a specific implementation, as shown in FIG. 2, a plurality of pixel sub-electrodes 4 are arranged in a second direction X, the first direction Y intersects with the second direction X, and the first direction Y is perpendicular to the second direction X in FIG. 2.

In some embodiments of the present disclosure, a distance between the pixel electrode and the common electrode is greater than or equal to 5 microns and less than or equal to 20 microns in a direction perpendicular to the first base substrate. For example, the distance between the pixel electrode and the common electrode may be 7 microns, 10 microns or 15 microns.

It should be noted that, in a related technology, a conventional capsular electrophoretic display panel needs to leave enough large migration distance of charged particles in a longitudinal direction (the direction perpendicular to the first base substrate), and a distance between the pixel electrode and the common electrode usually needs to be 100 microns. According to the display panel provided in the embodiment of the present disclosure, since the pixel sub-electrodes are disposed to generate horizontal electric fields to drive the charged particles to move so as to adjust the gray scale, the distance between the pixel electrode and the common electrode in the direction perpendicular to the first base substrate is much smaller than the distance between the pixel electrode and the common electrode in the conventional electrophoretic display panel, so that refresh time can be shortened and a thickness of the display panel can be reduced.

In some embodiments of the present disclosure, a distance between two adjacent pixel sub-electrodes in an arrangement direction of the pixel sub-electrodes is, for example, greater than or equal to 4 microns and less than or equal to 50 microns, and a width of a pixel sub-electrode is, for example, greater than or equal to 2 microns and less than or equal to 20 microns.

In a specific implementation, regardless of a shape of the pixel sub-electrodes included in the pixel electrode, the widths and thicknesses of the plurality of pixel sub-electrodes generating the electric fields for driving the charged particles to move in the direction parallel to the plane where the first base substrate is located may be the same. The distances between the pixel sub-electrodes may be set according to a pixel dimension, a quantity and the widths of the pixel sub-electrodes, and the distances between any two adjacent pixel sub-electrodes of the plurality of pixel sub-electrodes are the same. For example, in the arrangement direction of the plurality of pixel sub-electrodes, the width of the pixel is 56 microns; in the direction perpendicular to the first base substrate, the distance between the pixel electrode and the common electrode is 7 microns, and the thickness of the pixel sub-electrode is 0.07 microns. In the arrangement direction of the plurality of pixel sub-electrodes, the width of the pixel sub-electrodes is 4 microns, and a distance between two adjacent striped spacer wall electrode portions is 4 microns.

Figure 3:
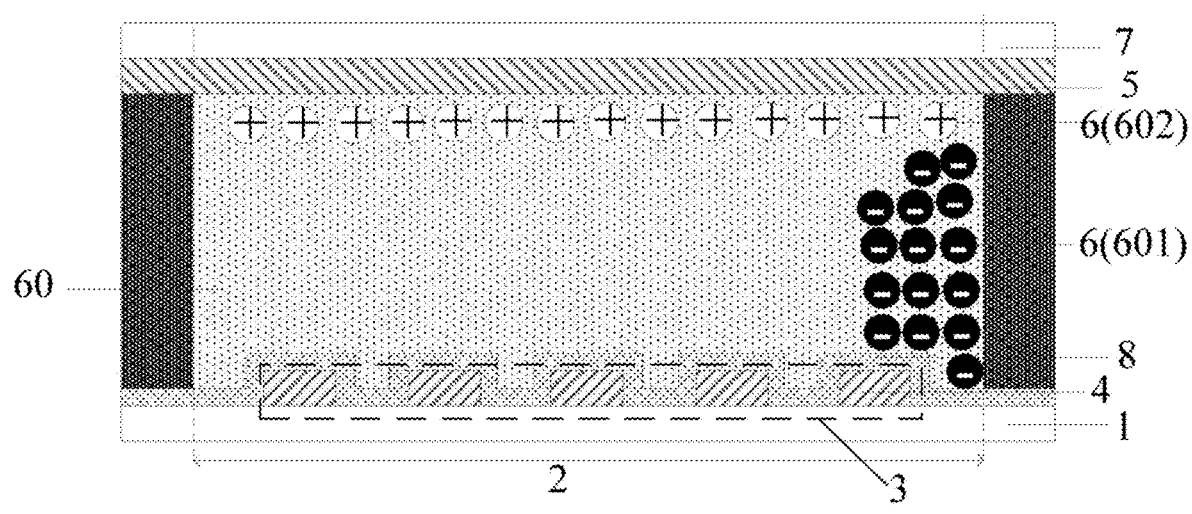
FIG. 3 is a schematic diagram of a structure of some other yet display panels according to an embodiment of the present disclosure.

In some embodiments of the present disclosure, as shown in FIG. 3, the display panel further includes a second insulation layer 8 between the pixel electrode 3 and the electrophoretic liquid layer 60. According to the display panel provided in the embodiment of the present disclosure, the second insulation layer is further disposed between the pixel electrode and the electrophoretic liquid layer, so that contact between the charged particles and the pixel electrode can be avoided, adsorption and agglomeration of the charged particles at the pixel electrode can be avoided, and electrochemical corrosion caused by direct contact between the pixel electrode and the charged particles, which affects a service life of the display panel, can further be avoided.

In some embodiments of the present disclosure, as shown in FIGS. 1 and 3, the plurality of charged particles 6 include a plurality of first color charged particles 601, and a plurality of second color charged particles 602 which are electrically opposite to the first color charged particles 601.

In some embodiments of the present disclosure, the first color charged particles are black charged particles, and the second color charged particles are white charged particles.

As an example, the black charged particles are positive particles and the white charged particles are negative particles; of course, the black charged particles may also be negative particles, and the white charged particles may also be positive particles, which is not limited here.

It should be noted that black charged particles may be used to achieve black state display, white charged particles may be used to achieve white state display, and the gray scale may be achieved according to an aggregation degree of the black charged particles and the white charged particles on a top and a side of the electrophoretic liquid layer. The top of the electrophoretic liquid layer refers to a part of the electrophoretic liquid layer on a side near the common electrode, and a bottom of the electrophoretic liquid layer refers to a part of the electrophoretic liquid layer on a side near the pixel electrode. For example, the more black charged particles on the top of the electrophoretic liquid layer, the lower a brightness of the pixel, and the more white charged particles on the top of the electrophoretic liquid layer, the higher the brightness of the pixel. In addition, the white charged particles also have a scattering effect. In a pixel, the lager a quantity of the white charged particles relative to a quantity of the black charged particles, the stronger the reflection effect, and the smaller the quantity of the white charged particles relative to the quantity of the black charged particles, the stronger the scattering effect.

In some embodiments of the present disclosure, the quantity of the first color charged particles is greater than, less than, or equal to the quantity of the second color charged particles.

Figure 4:
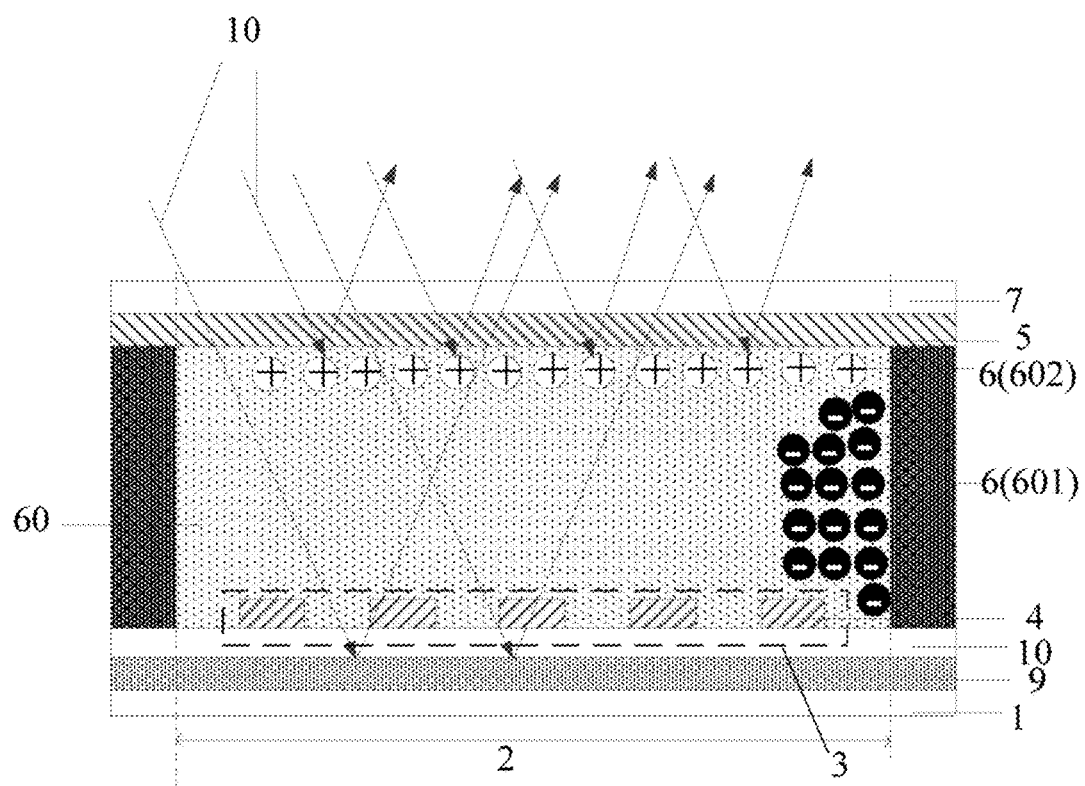
FIG. 4 is a schematic diagram of a structure of some other yet display panels according to an embodiment of the present disclosure.

In a specific implementation, the display panel may be a reflective display panel. In some embodiments, as shown in FIG. 4, the display panel further includes a reflective layer 9 between the first base substrate 1 and the electrophoretic liquid layer 60. The display panel provided in the embodiment of the present disclosure includes a reflective layer, so that light may be reflected after reaching the reflective layer, and the reflectivity is improved.

In a specific implementation, light is incident on the reflective display panel from a side of the second base substrate away from the common electrode.

In a specific implementation, the larger a region of the reflective layer shielded by the black charged particles, the lower an emitted light brightness of the pixel, and the smaller the region of the reflective layer shielded by the black charged particles, the higher the emitted light brightness of the pixel.

In a specific implementation, when the plurality of charged particles include white charged particles and black charged particles, a color of the reflective layer may be set as white in a case that the quantity of the white charged particles is less than the quantity of the black charged particles, thereby enhancing reflection of white light by disposing the reflective layer. As shown in FIG. 4, the black charged particles are driven to aggregate at an edge of the pixel through an electric field generated between the common electrode and the pixel electrode and electric fields generated between the pixel sub-electrodes of the pixel electrode, a light ray LT is reflected when reaching the white charged particles 602 and the reflective layer 9, thereby the white state display can be achieved by the white charged particles and the reflective layer.

In a specific implementation, when the plurality of charged particles are all black charged particles, the black charged particles may be used to achieve the black state display, the reflective layer may be used to achieve the white state display, the black charged particles may be driven to move by the electric field generated between the pixel electrode and the common electrode and the electric fields generated between the pixel sub-electrodes in the pixel electrode, and an area of a region of the reflective layer covered by the black charged particles may be adjusted by adjusting the aggregation degree of the black charged particles on the top or bottom of the electrophoretic liquid layer, thereby achieving adjustment of the reflectivity and different gray scales.

In some embodiments of the present disclosure, as shown in FIG. 4, the reflective layer 9 is located between the first base substrate 1 and the pixel electrode 3.

In some embodiments of the present disclosure, as shown in FIG. 4, the reflective layer 9 includes a metallic material, and the display panel further includes a first insulation layer 10 between the reflective layer 9 and the pixel electrode 3.

Figure 5:
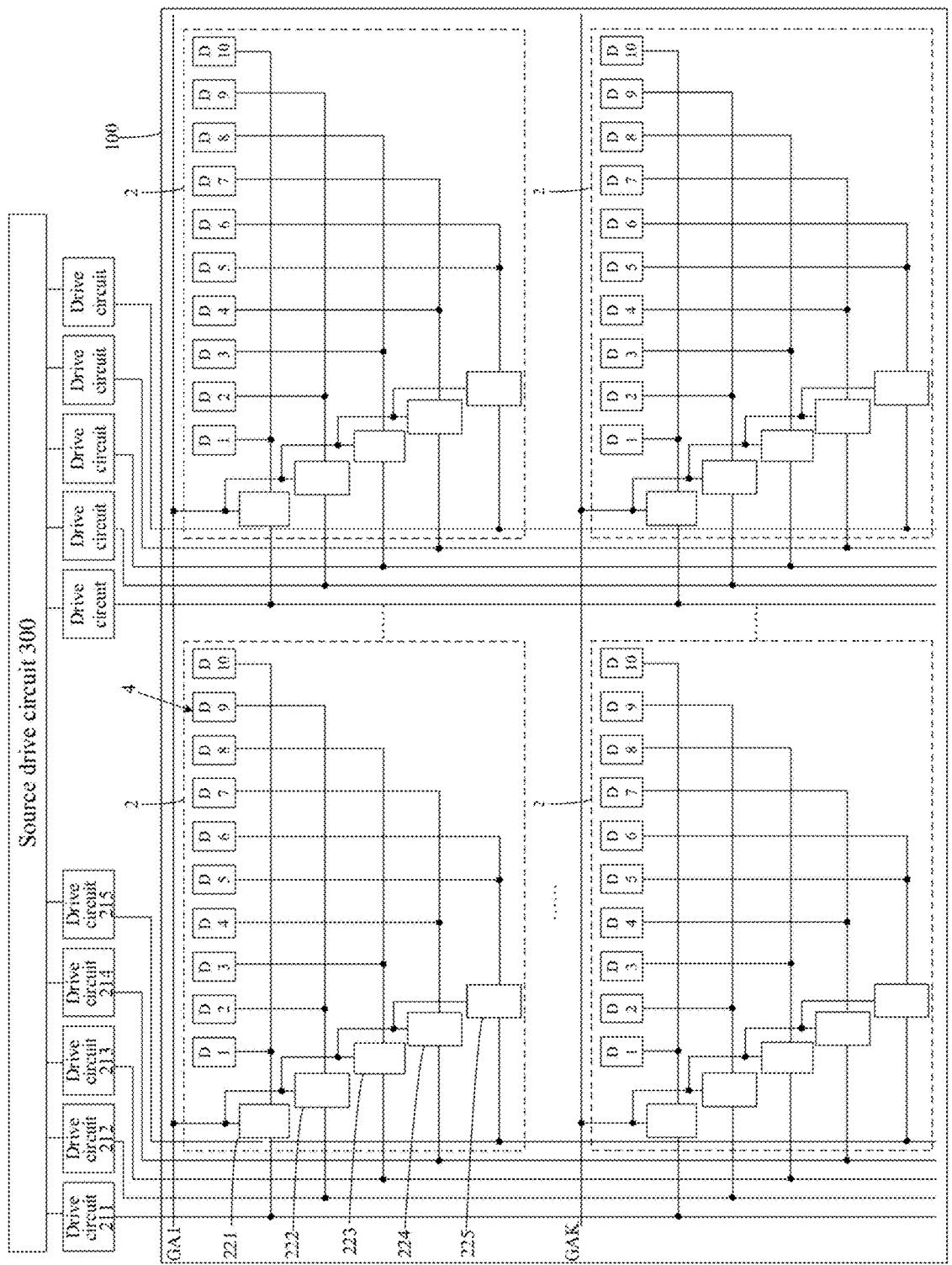
FIG. 5 is a schematic diagram of a structure of some other yet display panels according to an embodiment of the present disclosure.

As shown in FIG. 5 the display device provided in the embodiment of the present disclosure may further include a drive circuit. The drive circuit is configured to load first drive voltages with different maintaining durations to at least part of a plurality of pixel sub-electrodes 4 in a set pixel through a signal output terminal in a picture display stage, so that the set pixel is switched from a first state to a second state.

In some embodiments of the present disclosure, as shown in FIG. 5, the drive circuit is further configured to load first drive voltages with different maintaining durations to at least part of the plurality of pixel sub-electrodes 4 in the set pixel through the signal output terminal when the second state is maintained, in the picture display stage.

According to the display device provided in the embodiment of the present disclosure, after the set pixel is switched from the first state to the second state, at least part of the plurality of pixel sub-electrodes in the set pixel are loaded with the first drive voltages with different maintaining durations to achieve horizontal driving of corresponding charged particles, so that the charged particles are aggregated on both sides of the set pixel.

As an example, the set pixel may be one or more of the plurality of pixels. For example, the set pixel may be one pixel, two pixels, three pixels or more pixels of the plurality of pixels, which is not limited herein.

As an example, during switching of the set pixel from the first state to the second state, the first drive voltages with different maintaining durations may be loaded to at least part of the plurality of pixel sub-electrodes 4 in the set pixel through the signal output terminal.

As an example, the first state may be a black state, and the second state may be a white state. The first drive voltage is smaller than the common electrode voltage. During switching of the set pixel from the black state display to the white state display, at least part of the plurality of pixel sub-electrodes in the set pixel are loaded with drive voltages with different maintaining durations, and the common electrode is loaded with the common electrode voltage to drive the black charged particles horizontally, so that the black charged particles are aggregated on both sides of the set pixel, thereby increasing a white state reflectivity.

As an example, after the set pixel is switched from the first state to the second state, first drive voltages with different maintaining durations may be loaded to at least part of the plurality of pixel sub-electrodes 4 in the set pixel through the signal output terminal, either.

As an example, the first state may be the black state, and the second state may be the white state. The first drive voltage is smaller than the common electrode voltage. After the set pixel is switched from the black state display to the white state display, at least part of the plurality of pixel sub-electrodes in the set pixel are loaded with drive voltages with different maintaining durations, and the common electrode is loaded with the common electrode voltage to drive the black charged particles horizontally, so that the black charged particles are aggregated on both sides of the set pixel, thereby increasing a white state reflectivity.

In some embodiments of the present disclosure, a plurality of pixel sub-electrodes of the pixel electrode are divided into a plurality of sub-electrode groups, wherein the sub-electrode group includes at least one pixel sub-electrode. For example, each sub-electrode group may include one pixel sub-electrode. Alternatively, each sub-electrode group may include two, three, four or more adjacent pixel sub-electrodes.

In some embodiments of the present disclosure, the pixel electrode has a symmetry axis SZ in a column direction of the pixels, and the sub-electrode groups in the pixel electrode are symmetrical about the symmetry axis SZ. As an example, the sub-electrode group may include one pixel sub-electrode, two adjacent pixel sub-electrodes, three adjacent pixel sub-electrodes, four adjacent pixel sub-electrodes, or the like, which is not limited herein.

In some embodiments of the present disclosure, the pixel electrode includes an even number of sub-electrode groups. For example, the pixel electrode includes 2 sub-electrode groups, 4 sub-electrode groups, 6 sub-electrode groups, 8 sub-electrode groups, 10 sub-electrode groups, or more sub-electrode groups, which is not limited herein.

In some embodiments of the present disclosure, sub-electrode groups in a same pixel are divided into N drive units, and each of the drive units includes two sub-electrode groups disposed symmetrically.

Figure 6:
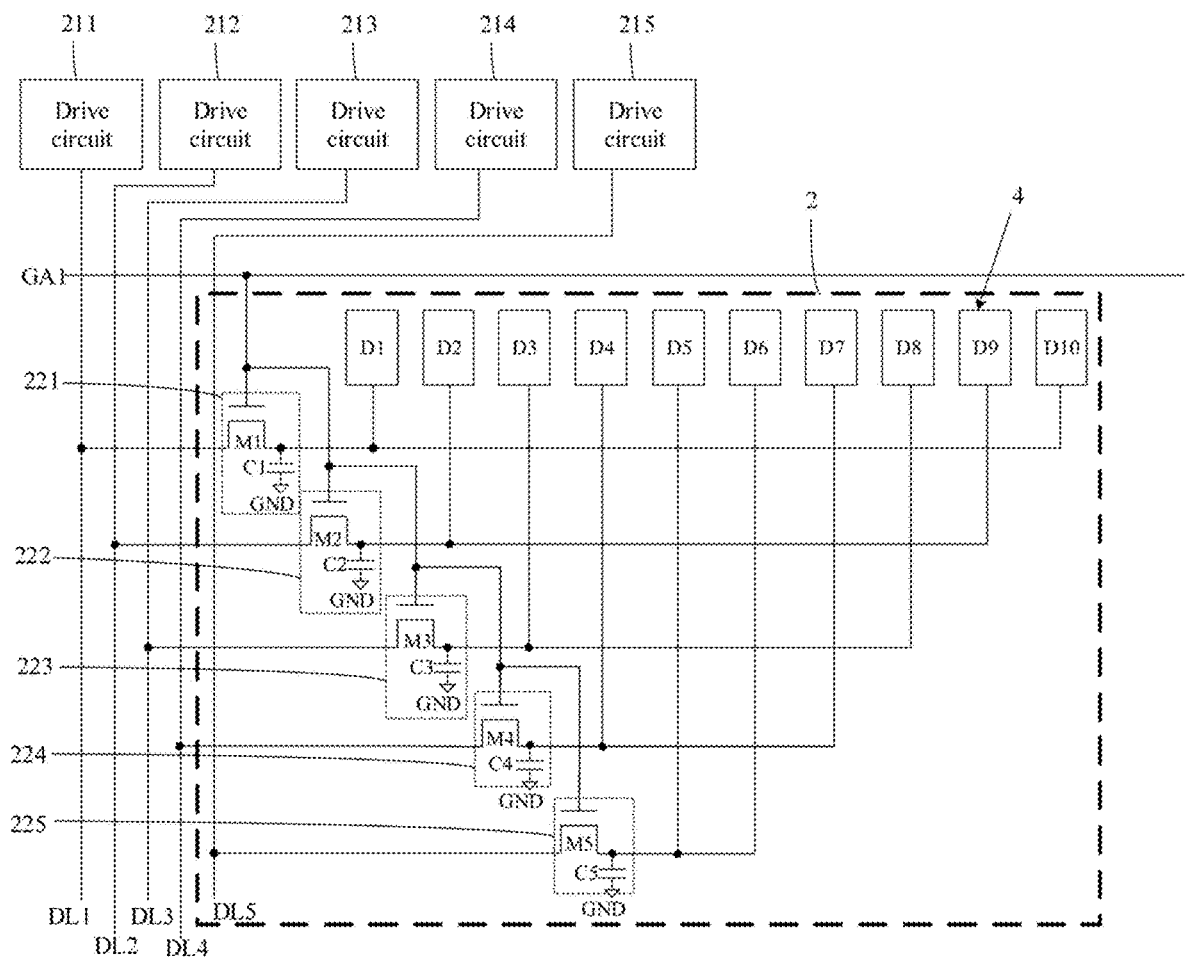
FIG. 6 is a schematic diagram of a structure of some other yet display panels according to an embodiment of the present disclosure.
Figure 7:
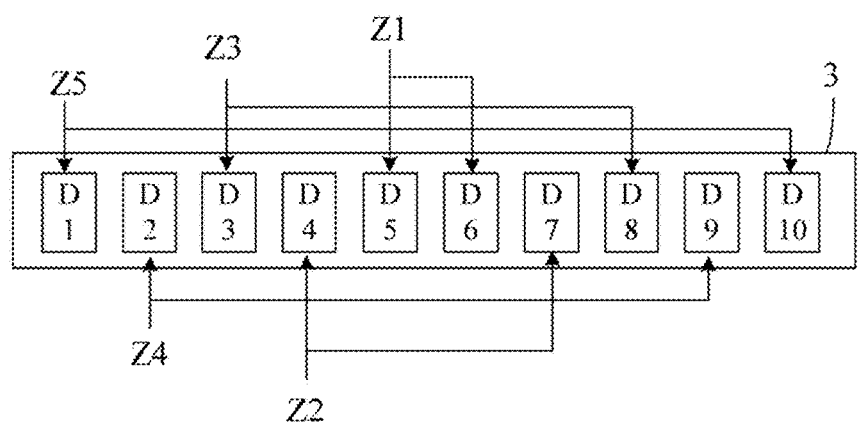
FIG. 7 is a schematic diagram of a structure of some other yet pixel sub-electrodes according to an embodiment of the present disclosure.

Exemplarily, a pixel electrode 3 including ten pixel sub-electrodes spaced from each other is taken as an example below, wherein each sub-electrode group includes one pixel sub-electrode. As shown in FIGS. 5 to 7, the ten pixel sub-electrodes included in the pixel electrode 3 may be defined as a pixel sub-electrode D1, a pixel sub-electrode D2, a pixel sub-electrode D3, a pixel sub-electrode D4, a pixel sub-electrode D5, a pixel sub-electrode D6, a pixel sub-electrode D7, a pixel sub-electrode D8, a pixel sub-electrode D9 and a pixel sub-electrode D10 in the order of arrangement. Each sub-electrode group includes one pixel sub-electrode. The pixel sub-electrode D1 and the pixel sub-electrode D10 are disposed mirror-symmetrically about the symmetry axis SZ along the column direction of the pixels, the pixel sub-electrode D2 and the pixel sub-electrode D9 are disposed mirror-symmetrically about the symmetry axis SZ along the column direction of the pixels, and the pixel sub-electrode D3 and the pixel sub-electrode D8 are disposed mirror-symmetrically about the symmetry axis SZ along the column direction of the pixels, the rest of the pixel sub-electrodes may be deduced similarly, which is not limited herein.

As shown in FIGS. 5 to 7, the pixel sub-electrode D5 and the pixel sub-electrode D6 may be divided as a first drive unit Z1, the pixel sub-electrode D4 and the pixel sub-electrode D7 may be divided as a second drive unit Z2, the pixel sub-electrode D3 and the pixel sub-electrode D8 may be divided as a third drive unit Z3, the pixel sub-electrode D2 and the pixel sub-electrode D9 may be divided as a fourth drive unit Z4, and the pixel sub-electrode D1 and the pixel sub-electrode D10 may be divided as a fifth drive unit Z5.

In some embodiments of the present disclosure, the drive circuit is further configured to load a first drive voltage with a same maintaining duration to the sub-electrode groups in a same drive unit, and load first drive voltages with different maintaining durations to sub-electrode groups in different drive units, in the set pixel.

For example, as shown in FIGS. 5 to 8, z1 represents a signal loaded to the pixel sub-electrode D5 and the pixel sub-electrode D6 in the first drive unit Z1 after the first state is switched to the second state, z2 represents a signal loaded to the pixel sub-electrode D4 and the pixel sub-electrode D7 in the second drive unit Z2 after the first state is switched to the second state, z3 represents a signal loaded to the pixel sub-electrode D3 and the pixel sub-electrode D8 in the third drive unit Z3 after the first state is switched to the second state, z4 represents a signal loaded to the pixel sub-electrode D2 and the pixel sub-electrode D9 in the fourth drive unit Z4 after the first state is switched to the second state, and z5 represents a signal loaded to the pixel sub-electrode D1 and the pixel sub-electrode D10 in the fifth drive unit Z5 after the first state is switched to the second state, vcom represents a common electrode voltage, and −vdd represents a first drive voltage loaded to each pixel sub-electrodes. A maintaining duration t11 of the first drive voltage −vdd loaded to the first drive unit Z1, a maintaining duration t12 of the first drive voltage −vdd loaded to the second drive unit Z2, a maintaining duration t13 of the first drive voltage −vdd loaded to the third drive unit Z3, a maintaining duration t14 of the first drive voltage −vdd loaded to the fourth drive unit Z4, and a maintaining duration t15 of the first drive voltage −vdd loaded to the fifth drive unit Z5, are different.

In some embodiments of the present disclosure, the N drive units are defined as a first drive unit to an N-th drive unit in a direction from a drive unit close to the symmetry axis SZ to a drive unit away from the symmetry axis SZ. The drive circuit is further configured to sequentially increase the maintaining durations of first drive voltages loaded from the first drive unit to the N-th drive unit in the set pixel. For example, as shown in FIGS. 5 to 8, a maintaining duration t11 of the first drive voltage −vdd loaded to the first drive unit Z1, a maintaining duration t12 of the first drive voltage −vdd loaded to the second drive unit Z2, a maintaining duration t13 of the first drive voltage −vdd loaded to the third drive unit Z3, a maintaining duration t14 of the first drive voltage −vdd loaded to the fourth drive unit Z4, and a maintaining duration t15 of the first drive voltage −vdd loaded to the fifth drive unit Z5, are increased sequentially.

As an example, t11 may be ⅕ tx, t12 may be ⅖ tx, t13 may be ⅗ tx, t14 may be ⅘ tx, and t15 may be tx, wherein tx is a maintaining duration of a picture display stage.

In some embodiments of the present disclosure, the drive circuit is further configured to, in the picture display stage, load a second drive voltage with a same maintaining duration to the plurality of pixel sub-electrodes in the set pixel through the signal output terminal, to switch the set pixel from the second state to the first state.

As an example, the second drive voltage with the same maintaining duration may be loaded to the plurality of pixel sub-electrodes in the set pixel through the signal output terminal during the switching of the set pixel from the second state to the first state.

As an example, the first state may be the black state, and the second state may be the white state. The second drive voltage is higher than the common electrode voltage. During switching of the set pixel from the white state display to the black state display, the plurality of pixel sub-electrodes in the set pixel are loaded with the second drive voltage with the same maintaining duration through the signal output terminal, so that the black state display can be achieved.

As an example, the second drive voltage with the same maintaining duration may be loaded to the plurality of pixel sub-electrodes in the set pixel through the signal output terminal after the set pixel is switched from the second state to the first state.

As an example, the first state may be the black state, and the second state may be the white state. The second drive voltage is higher than the common electrode voltage. After the set pixel is switched from the white state display to the black state display, the plurality of pixel sub-electrodes in the set pixel are loaded with the second drive voltage with the same maintaining duration through the signal output terminal, so that the black state display can be achieved.

For example, as shown in FIGS. 5, 6, 7 and 9, vcom represents the common electrode voltage, and vdd represents the second drive voltage loaded to each of the pixel sub-electrodes. z1' represents a signal loaded to the pixel sub-electrode D5 and the pixel sub-electrode D6 in the first drive unit Z1 after the second state is switched to the first state, z2' represents a signal loaded to the pixel sub-electrode D4 and the pixel sub-electrode D7 in the second drive unit Z2 after the second state is switched to the first state, z3' represents a signal loaded to the pixel sub-electrode D3 and the pixel sub-electrode D8 in the third drive unit Z3 after the second state is switched to the first state, z4' represents a signal loaded to the pixel sub-electrode D2 and the pixel sub-electrode D9 in the fourth drive unit Z4 after the second state is switched to the first state, and z5' represents a signal loaded to the pixel sub-electrode D1 and the pixel sub-electrode D10 in the fifth drive unit Z5 after the second state is switched to the first state. A maintaining duration of the second drive voltage vdd in the signal z1' loaded to the first drive unit Z1, a maintaining duration of the second drive voltage vdd in the signal z2' loaded to the second drive unit Z2, a maintaining duration of the second drive voltage vdd in the signal z3' loaded to the third drive unit Z3, a maintaining duration of the second drive voltage vdd in the signal z4' loaded to the fourth drive unit Z4, and a maintaining duration of the second drive voltage vdd in the signal z5' loaded to the fifth drive unit Z5 are same.

In an embodiment of the present disclosure, there are a plurality of drive circuits, wherein each column of pixels corresponds to N drive circuits of the plurality of drive circuits. The pixel further includes N switch control circuits. An n-th drive unit in each column of pixels is coupled to a signal output terminal of an n-th drive circuit of the N drive circuits by an n-th switch control circuit of the N switch control circuits. The switch control circuit is configured to make a signal output terminal of a corresponding drive circuit be conductive with the corresponding drive unit under control of a signal at a scanning signal terminal.

As an example, as shown in FIGS. 5 to 7, each column of pixels corresponds to five drive circuits 211 to 215, and the pixel further include five switch control circuits 221 to 225. The first drive unit Z1 in each column of pixels is coupled to a signal output terminal of the first drive circuit 211 through the first switch control circuit 221. The first switch control circuit 221 is further configured to make the signal output terminal of the corresponding drive circuit 221 be conductive with the corresponding drive unit Z1 under control of a signal at a scanning signal terminal.

The second drive unit Z2 in each column of pixels is coupled to a signal output terminal of the second drive circuit 212 through the second switch control circuit 222. The second switch control circuit 222 is configured to make a signal output terminal of the corresponding drive circuit 212 be conductive with the corresponding drive unit Z2 under control of a signal at a scanning signal terminal.

The third drive unit Z3 in each column of pixels is coupled to a signal output terminal of the third drive circuit 213 through the third switch control circuit 223. The third switch control circuit 223 is configured to make a signal output terminal of the corresponding drive circuit 213 be conductive with the corresponding drive unit Z3 under control of a signal at a scanning signal terminal.

The fourth drive unit Z4 in each column of pixels is coupled to a signal output terminal of the fourth drive circuit 214 through the fourth switch control circuit 224. The fourth switch control circuit 224 is configured to make a signal output terminal of the corresponding drive circuit 214 be conductive with the corresponding drive unit Z4 under control of a signal at a scanning signal terminal.

The fifth drive unit Z5 in each column of pixels is coupled to a signal output terminal of the fifth drive circuit 215 through the fifth switch control circuit 225. The fifth switch control circuit 225 is configured to make a signal output terminal of the corresponding drive circuit 215 be conductive with the corresponding drive unit Z5 under control of a signal at a scanning signal terminal.

In some embodiments of the present disclosure, the switch control circuit includes a conducting transistor, wherein a gate of the conducting transistor is coupled to the scanning signal terminal, a first electrode of the conducting transistor is coupled to the signal output terminal, and a second electrode of the conducting transistor is coupled to the drive unit.

In some embodiments of the present disclosure, the switch control circuit further includes a capacitor, wherein a first electrode of the capacitor is coupled with the second electrode of the conducting transistor, and a second electrode of the capacitor is coupled with a ground terminal.

As an example, as shown in FIGS. 5 and 6, the first switch control circuit 221 includes a conducting transistor M1 and a capacitor C1. A gate of the conducting transistor M1 is coupled to a scanning signal terminal, a first electrode of the conducting transistor M1 is coupled to the signal output terminal of the first drive circuit 211, and a second electrode of the conducting transistor M1 is coupled to the first drive unit Z1. A first electrode of the capacitor C1 is coupled to the second electrode of the conducting transistor M1, and a second electrode of the capacitor C1 is coupled to a ground terminal GND.

As an example, as shown in FIGS. 5 and 6, the second switch control circuit 222 includes a conducting transistor M2 and a capacitor C2. A gate of the conducting transistor M2 is coupled to a scanning signal terminal, a first electrode of the conducting transistor M2 is coupled to the signal output terminal of the second drive circuit 212, and a second electrode of the conducting transistor M2 is coupled to the second drive unit Z2. A first electrode of the capacitor C2 is coupled to the second electrode of the conducting transistor M2, and a second electrode of the capacitor C2 is coupled to the ground terminal GND.

As an example, as shown in FIGS. 5 and 6, the third switch control circuit 223 includes a conducting transistor M3 and a capacitor C3. A gate of the conducting transistor M3 is coupled to a scanning signal terminal, a first electrode of the conducting transistor M3 is coupled to the signal output terminal of the third drive circuit 213, and a second electrode of the conducting transistor M3 is coupled to the third drive unit Z3. A first electrode of the capacitor C3 is coupled to the second electrode of the conducting transistor M3, and a second electrode of the capacitor C3 is coupled to the ground terminal GND.

As an example, as shown in FIGS. 5 and 6, the fourth switch control circuit 224 includes a conducting transistor M4 and a capacitor C4. A gate of the conducting transistor M4 is coupled to a scanning signal terminal, a first electrode of the conducting transistor M4 is coupled to the signal output terminal of the fourth drive circuit 214, and a second electrode of the conducting transistor M4 is coupled to the fourth drive unit Z4. A first electrode of the capacitor C4 is coupled to the second electrode of the conducting transistor M4, and a second electrode of the capacitor C4 is coupled to the ground terminal GND.

As an example, as shown in FIGS. 5 and 6, the fifth switch control circuit 225 includes a conducting transistor M5 and a capacitor C5. A gate of the conducting transistor M5 is coupled to a scanning signal terminal, a first electrode of the conducting transistor M5 is coupled to the signal output terminal of the fifth drive circuit 215, and a second electrode of the conducting transistor M5 is coupled to the fifth drive unit Z5. A first electrode of the capacitor C5 is coupled to the second electrode of the conducting transistor M5, and a second electrode of the capacitor C5 is coupled to the ground terminal GND.

In an embodiment of the present disclosure, the display panel further includes a plurality of scanning signal lines, wherein a scanning signal terminal of a switch control circuit in each row of pixels is coupled to one of the plurality of scanning signal lines. As shown in FIGS. 5 and 6, for example, scanning signal terminals of switch control circuits M1 to M5 in a first row of pixels are coupled to a scanning signal line GA1, and so on, similarly, scanning signal terminals of switch control circuits M1 to M5 in a K-th row of pixels are coupled to a scanning signal line GAK.

In an embodiment of the present disclosure, the display panel further includes a plurality of data signal lines, wherein an n-th switch control circuit in each column of pixels is coupled to the signal output terminal of the n-th drive circuit through one of the plurality of data signal lines. As an example, as shown in FIGS. 5 and 6, the first switch control circuit M1 in each column of pixels is coupled to the signal output terminal of the first drive circuit 211 through a data signal line DL1. The second switch control circuit M2 in each column of pixels is coupled to the signal output terminal of the second drive circuit 212 through a data signal line DL2. The third switch control circuit M3 in each column of pixels is coupled to the signal output terminal of the third drive circuit 213 through a data signal line DL3. The fourth switch control circuit M4 in each column of pixels is coupled to the signal output terminal of the fourth drive circuit 214 through a data signal line DL4. The fifth switch control circuit M5 in each column of pixels is coupled to the signal output terminal of the fifth drive circuit 215 through a data signal line DL5.

In some embodiments of the present disclosure, as shown in FIG. 5, the display device further includes a source drive circuit 300. The source drive circuit 300 may acquire display data of a display frame, input a corresponding data voltage to a data input terminal of each of the drive circuits 211 to 215 according to the display data, and enable the drive circuits 211 to 215 to load first drive voltages with different maintaining durations to at least part of the plurality of pixel sub-electrodes in the set pixel through the signal output terminal according to the received data voltages after the set pixel is switched from the first state to the second state. Furthermore, after the set pixel of the plurality of pixels is switched from the second state to the first state, the source drive circuit 300 may enable the drive circuits 211 to 215 to load the second drive voltage for a same maintaining duration to the plurality of pixel sub-electrodes in the set pixels through the signal output terminal based on the received data voltage.

As an example, the drive circuits 211-215 may be integrally disposed in the source drive circuit 300. Alternatively, the drive circuits 211 to 215 may be integrated in another drive chip, which is not limited herein.

In some embodiments of the present disclosure, the drive circuit includes a first control sub-circuit, a second control sub-circuit, and a third control sub-circuit. The first control sub-circuit is coupled to a first node and configured to provide a signal of a first power supply terminal to the first node when a data voltage at the data input terminal is higher than a set voltage, and to provide a signal of a second power supply terminal to the first node when the data voltage at the data input terminal is lower than the set voltage. The second control sub-circuit is coupled to a second node and configured to provide a signal of a first ramp signal terminal to the second node when a data voltage at the data input terminal is higher than a set voltage, and to provide a signal of a second ramp signal terminal to the second node when the data voltage of the data input terminal is lower than the set voltage. The third control sub-circuit is coupled to the first node and the second node, and configured to output a first drive voltage to the signal output terminal according to the data voltage at the data input terminal, a voltage of the signal of the first node, and a voltage of the signal of the second node.

Figure 10:
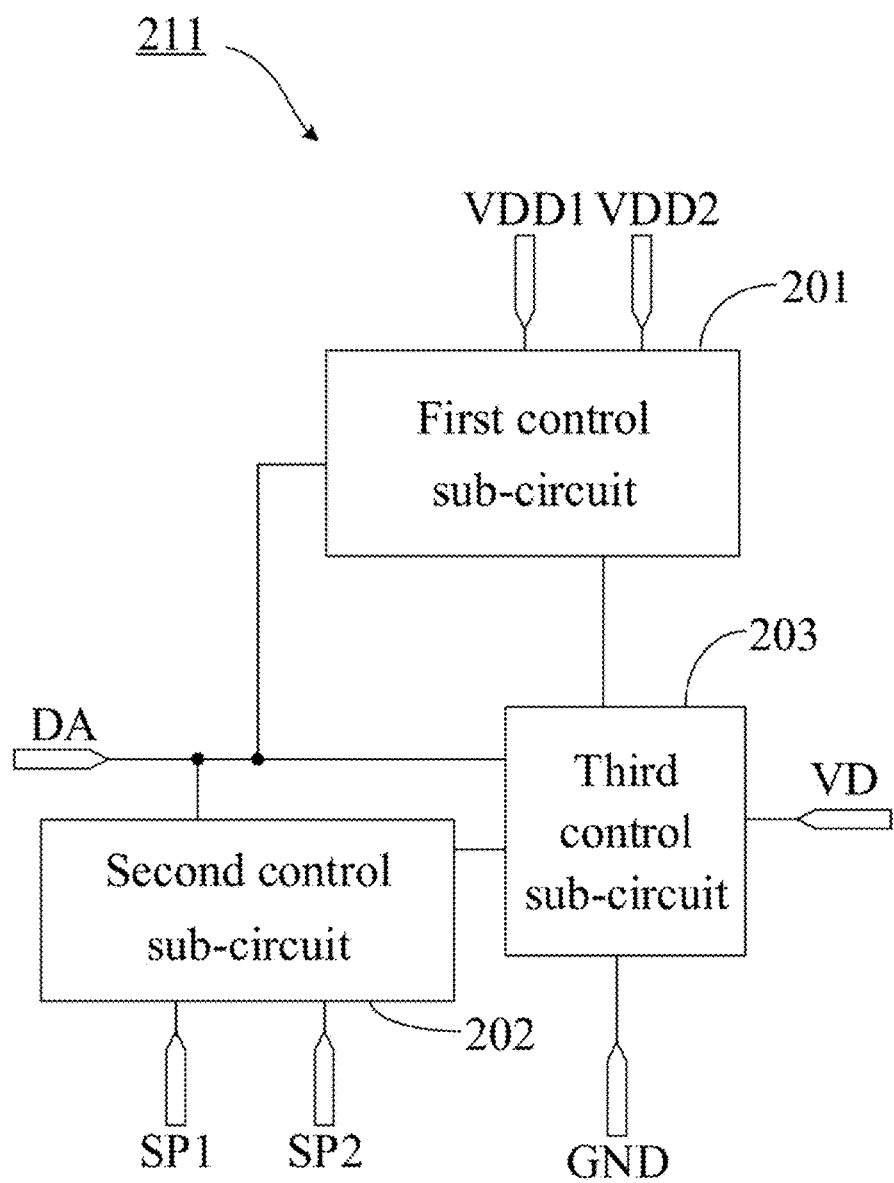
FIG. 10 is a schematic diagram of a structure of some drive circuits according to an embodiment of the present disclosure.

For example, the drive circuit 211 is taken as an example. As shown in FIG. 10, the drive circuit 211 includes a first control sub-circuit 201, a second control sub-circuit 202 and a third control sub-circuit 203. The first control sub-circuit 201 is coupled to the first node N1, and configured to provide a signal of the first power supply terminal VDD1 to the first node N1 when the data voltage at the data input terminal DA is higher than the set voltage, and to provide a signal of the second power supply terminal VDD2 to the first node N1 when the data voltage of the data input terminal DA is lower than the set voltage.

The second control sub-circuit 202 is coupled to the second node N2, and configured to provide a signal of the first ramp signal terminal SP1 to the second node N2 when the data voltage at the data input terminal DA is higher than the set voltage, and to provide a signal of the second ramp signal terminal SP2 to the second node N2 when the data voltage at the data input terminal DA is lower than the set voltage.

The third control sub-circuit 203 is coupled to the first node N1 and the second node N2, and configured to output a drive voltage to the signal output terminal VD according to the data voltage at the data input terminal DA, the voltage of the signal of the first node N1, and the voltage of the signal of the second node N2.

As an example, the set voltage may be a common electrode voltage (e.g. 0V). Of course, the set voltage may also be set to other voltages, which is not repeated herein.

Figure 11:
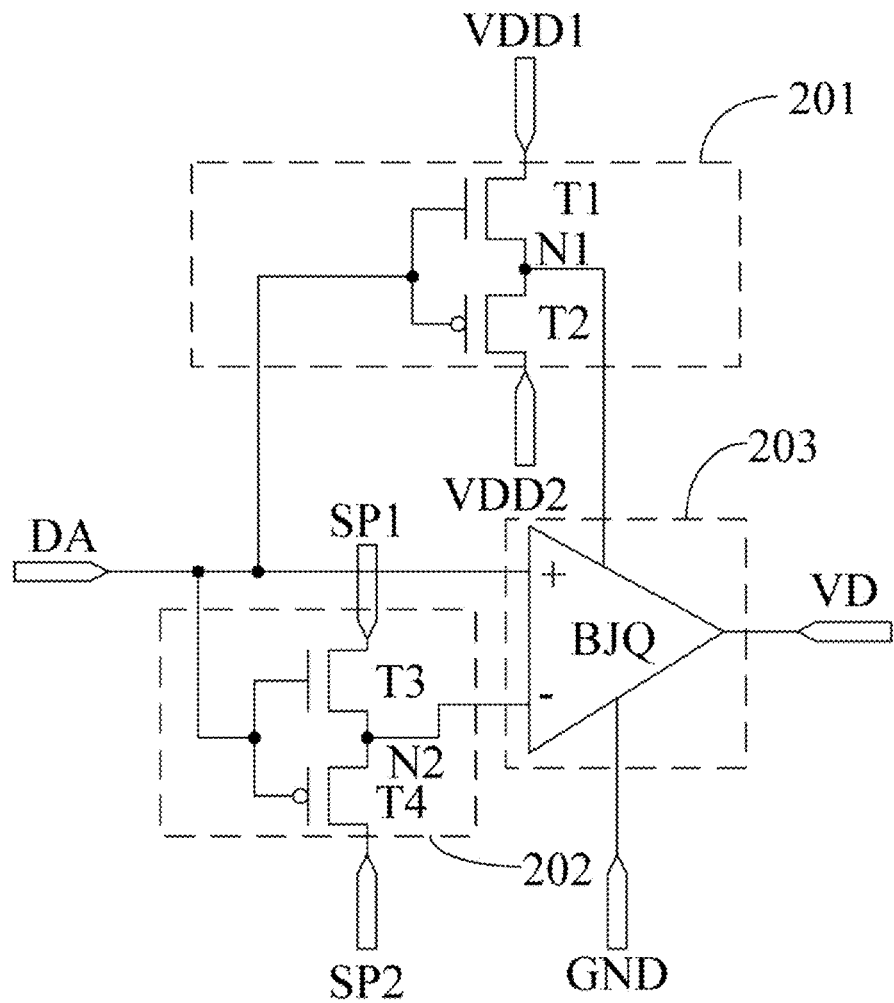
FIG. 11 is a schematic diagram of a structure of some other yet drive circuits according to an embodiment of the present disclosure.

In some embodiments of the present disclosure, as shown in FIG. 11, the first control sub-circuit 201 includes a first transistor T1 and a second transistor T2. A gate of the first transistor T1 is coupled to the data input terminal DA, a first electrode of the first transistor T1 is coupled to the first power supply terminal VDD1, and a second electrode of the first transistor T1 is coupled to the first node N1. A gate of the second transistor T2 is coupled to the data input terminal DA, a first electrode of the second transistor T2 is coupled to the first node N1, and a second electrode of the second transistor T2 is coupled to the second power supply terminal VDD2.

As an example, the first transistor T1 may be controlled to be turned on when the data voltage at the data input terminal DA is higher than the set voltage, otherwise, the first transistor T1 may be turned off.

As an example, the second transistor T2 may be controlled to be turned on when the data voltage at the data input terminal DA is lower than the set voltage, otherwise, the second transistor T2 may be turned off.

As an example, the voltage at the first power supply terminal VDD1 is the second drive voltage. A specific value of the second drive voltage may be determined according to an actual application requirement, which is not limited here.

As an example, the voltage at the second power supply terminal VDD2 is the first drive voltage. A specific value of the first drive voltage may be determined according to an actual application requirement, which is not limited here.

Figure 8:
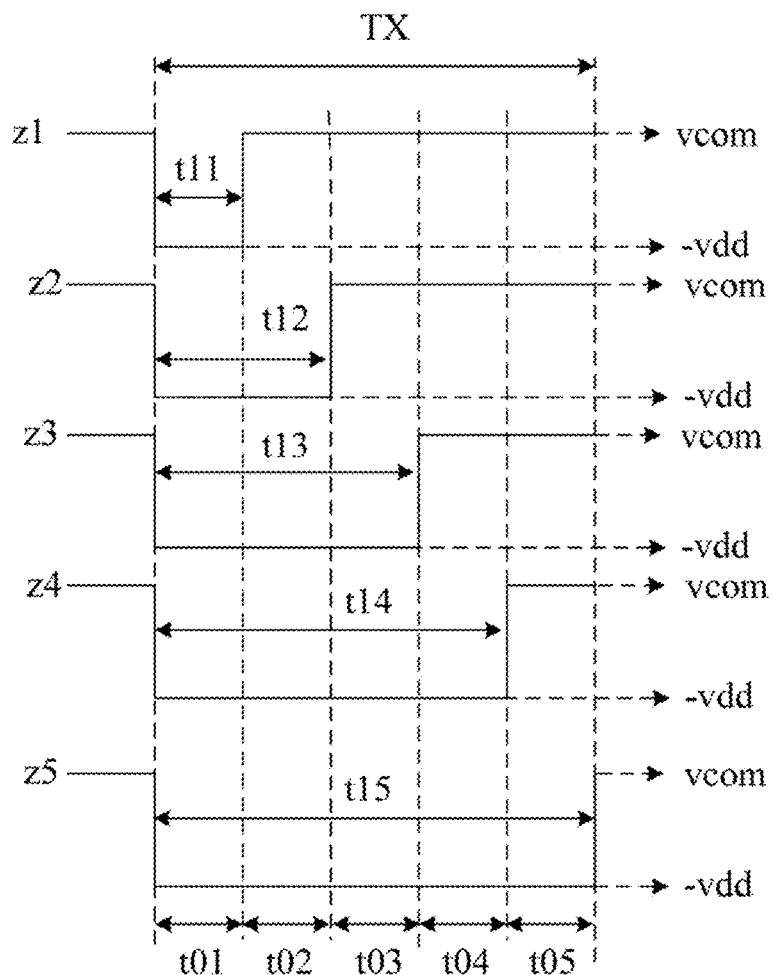
FIG. 8 is a timing diagram of some signals according to an embodiment of the present disclosure.
Figure 9:
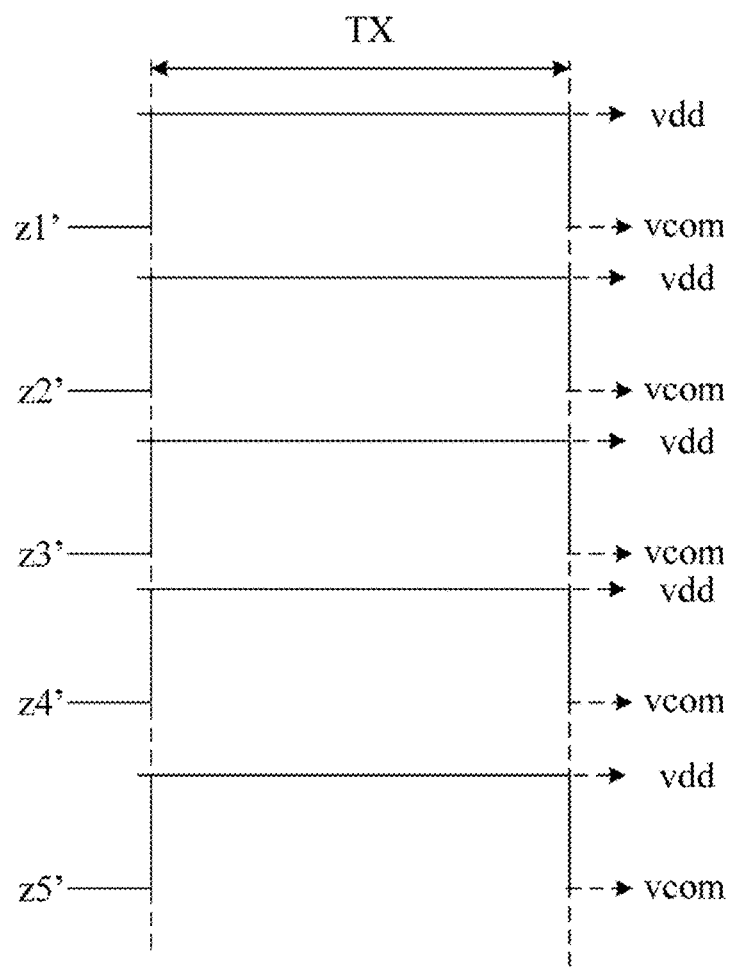
FIG. 9 is a timing diagram of some other yet signals according to an embodiment of the present disclosure.

In some embodiments of the present disclosure, as shown in FIG. 8, the second control sub-circuit 202 includes a third transistor T3 and a fourth transistor T4. A gate of the third transistor T3 is coupled to the data input terminal DA, a first electrode of the third transistor T3 is coupled to the first ramp signal terminal SP1, and a second electrode of the third transistor T3 is coupled to the second node N2. A gate of the fourth transistor T4 is coupled to the data input terminal DA, a first electrode of the fourth transistor T4 is coupled to the second node N2, and a second electrode of the fourth transistor T4 is coupled to the second ramp signal terminal SP2.

As an example, the third transistor T3 may be controlled to be turned on when the data voltage at the data input terminal DA is higher than the set voltage, otherwise, the third transistor T3 may be turned off.

As an example, the fourth transistor T4 may be controlled to be turned on when the data voltage at the data input terminal DA is lower than the set voltage, otherwise, the fourth transistor T4 may be turned off.

Figure 12:
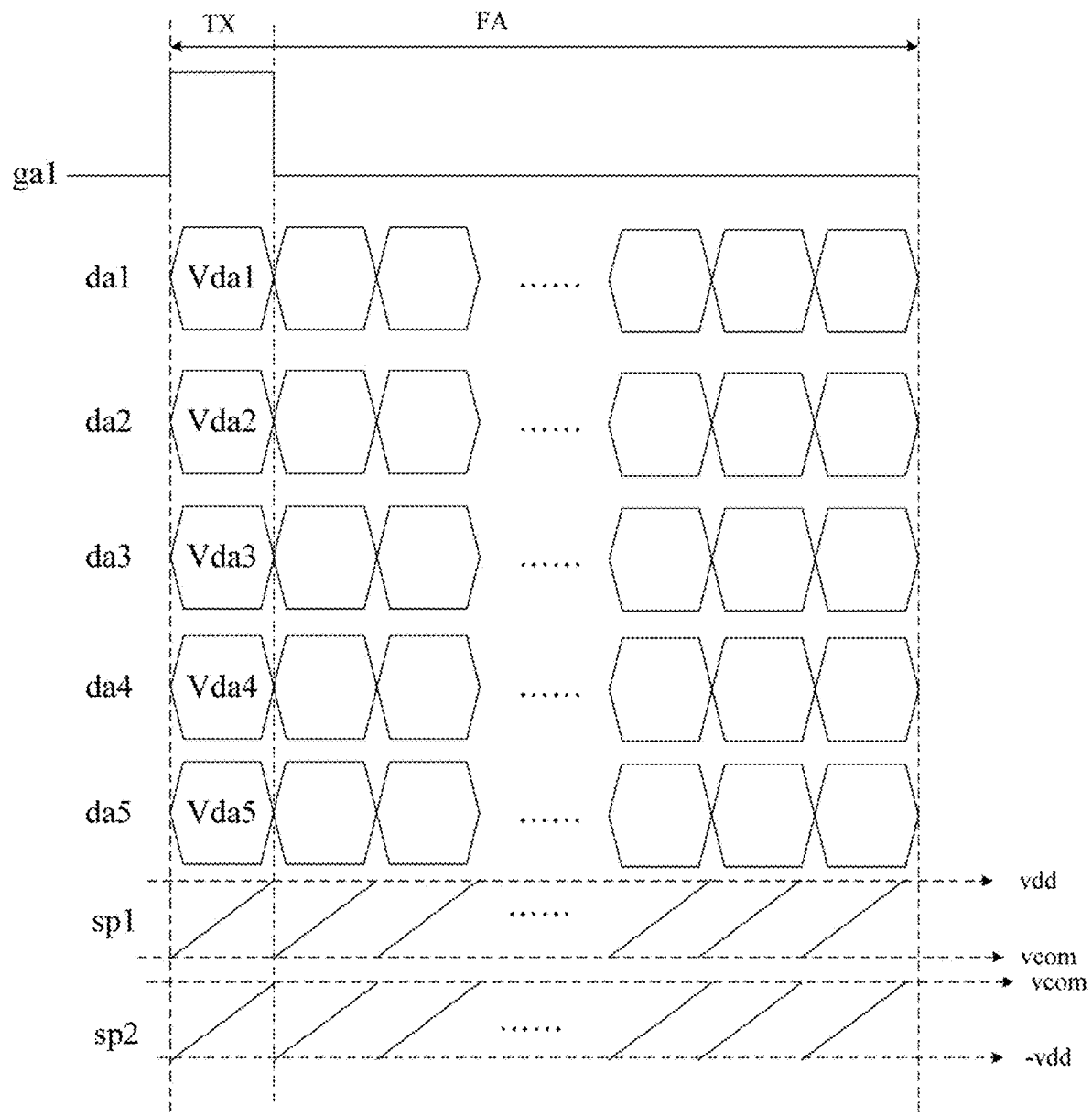
FIG. 12 is a timing diagram of some other yet signals according to an embodiment of the present disclosure.

As an example, as shown in FIG. 12, the first ramp signal terminal SP1 has a ramp signal sp1 which is linearly increased from a common electrode voltage to the second drive voltage.

As an example, as shown in FIG. 12, the second ramp signal terminal SP2 has a ramp signal sp2 which is linearly increased from the first drive voltage to the common electrode voltage.

As an example, a slope at the first ramp signal terminal SP1 is the same as a slope at the second ramp signal terminal SP2.

In some embodiments of the present disclosure, as shown in FIG. 8, the third control sub-circuit 203 includes a comparator BJQ. A first input terminal of the comparator BJQ is coupled to the data signal terminal DA, a second input terminal of the comparator BJQ is coupled to the second node N2, a third input terminal of the comparator BJQ is coupled to the first node N1, a fourth input terminal of the comparator BJQ is coupled to the ground terminal GND, and an output terminal of the comparator BJQ is coupled to the signal output terminal VD.

As an example, the first input terminal of the comparator BJQ may be a positive phase input terminal, the second input terminal of the comparator BJQ may be a negative phase input terminal, and when a voltage at its first input terminal is larger than a voltage at its second input terminal, a voltage at the first node N1 may be output to the signal output terminal VD; when the voltage at the first input terminal of the comparator BJQ is smaller than the voltage at the second input terminal, a voltage at the ground terminal GND may be output to the signal output terminal VD.

The rest drive circuits 212 to 215 may refer to the embodiment of the drive circuit 211, which is not repeated herein.

Figure 13:
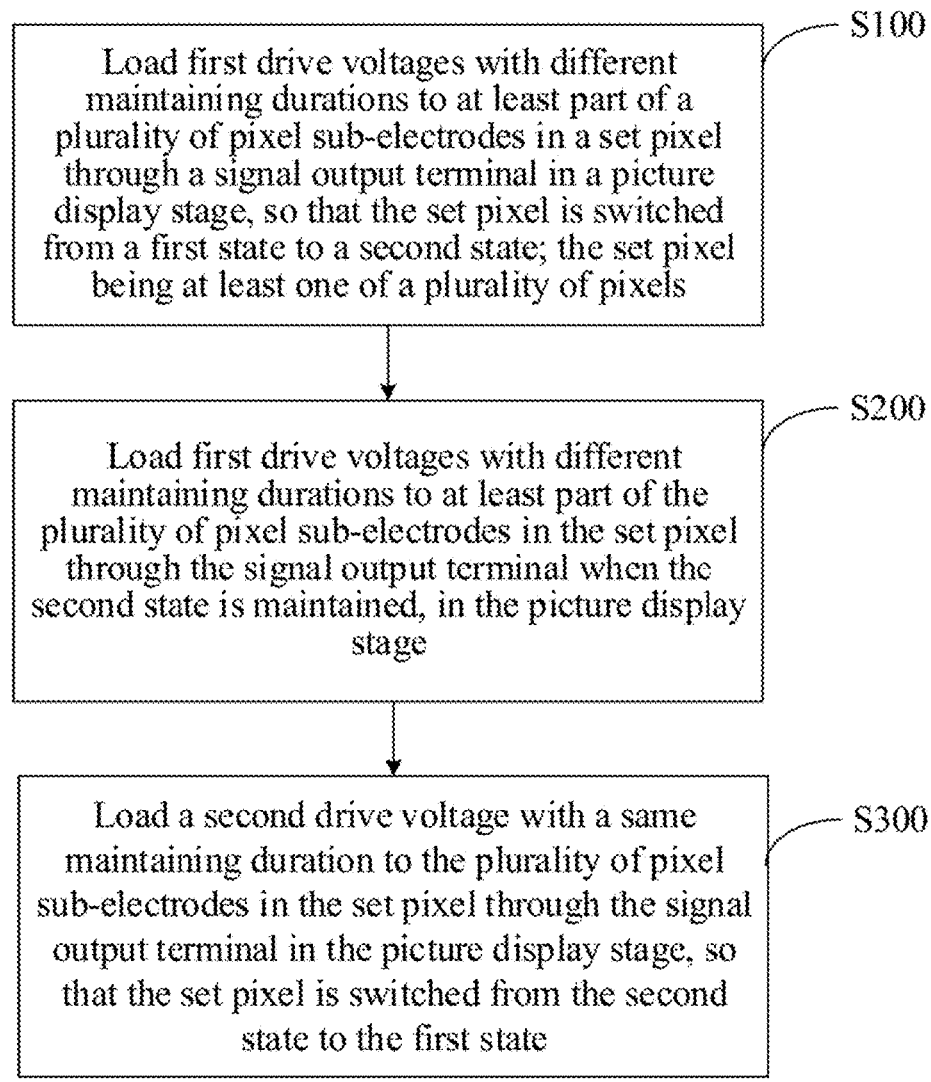
FIG. 13 is a flowchart of a driving method according to an embodiment of the present disclosure.
Figure 14:
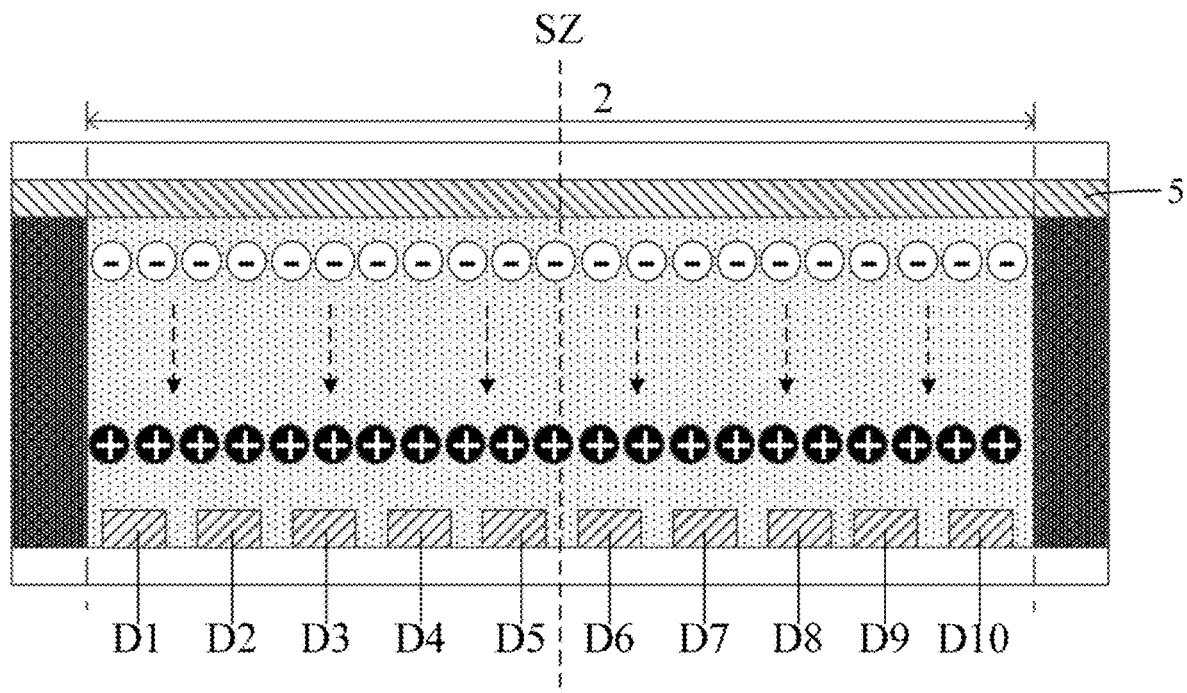
FIG. 14 is a schematic diagram of a structure of some other yet display panels according to an embodiment of the present disclosure.
Figure 15:
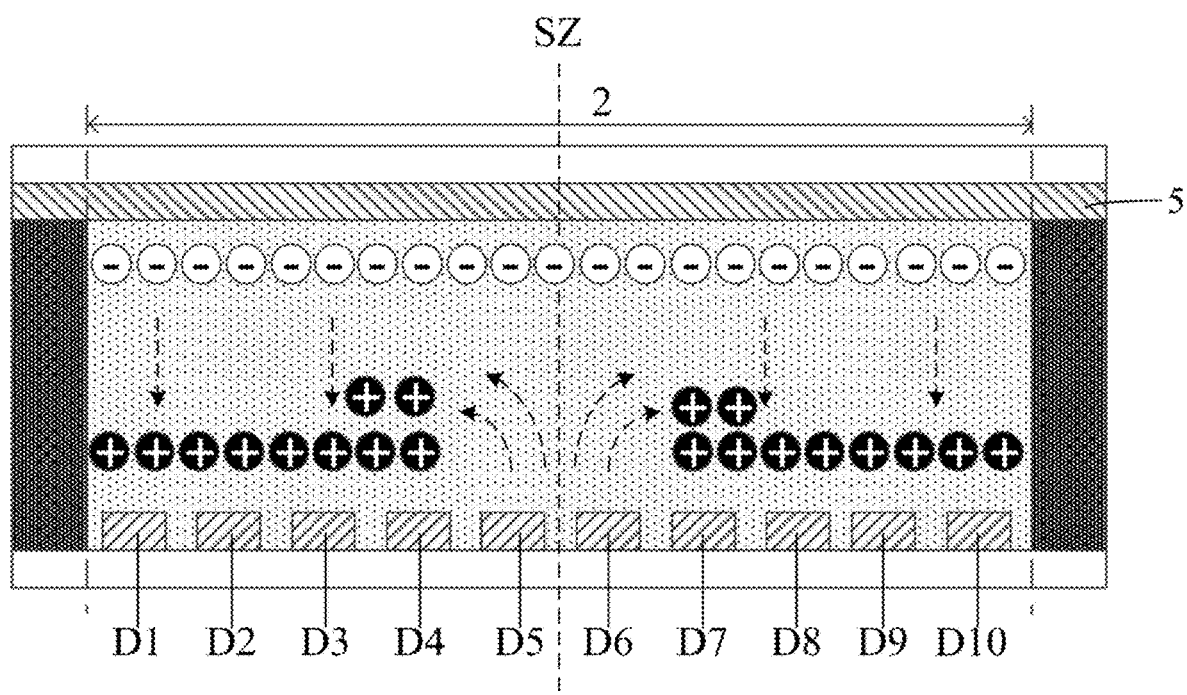
FIG. 15 is a schematic diagram of a structure of some other yet display panels according to an embodiment of the present disclosure.
Figure 16:
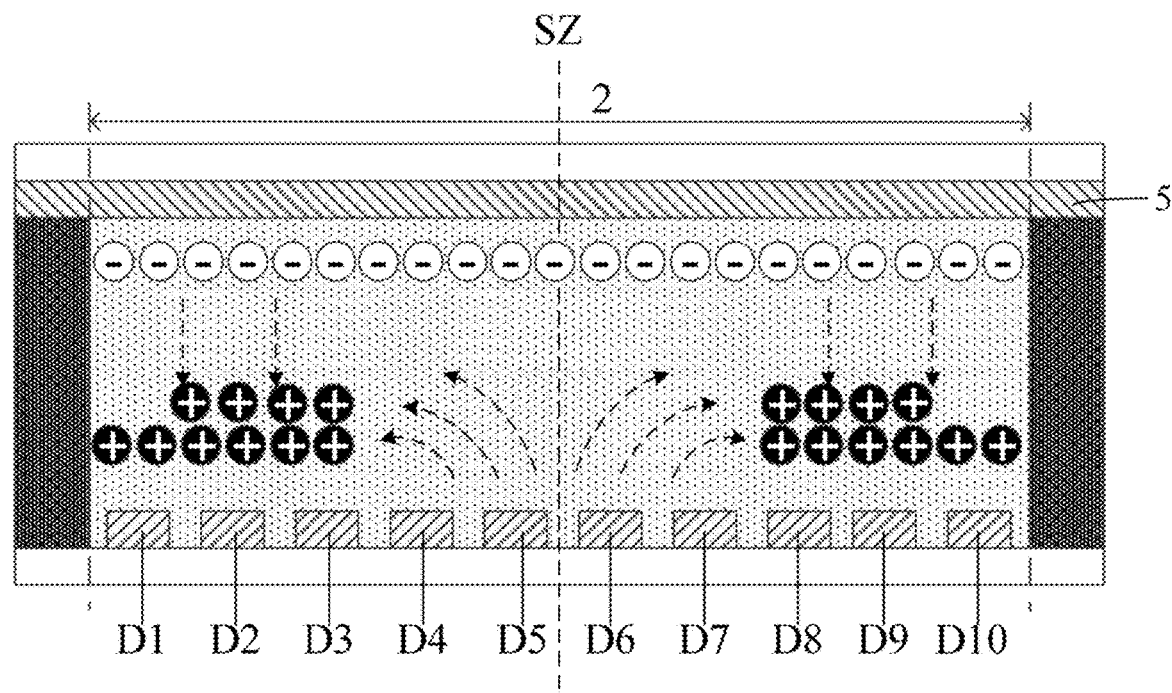
FIG. 16 is a schematic diagram of a structure of some other yet display panels according to an embodiment of the present disclosure.
Figure 17:
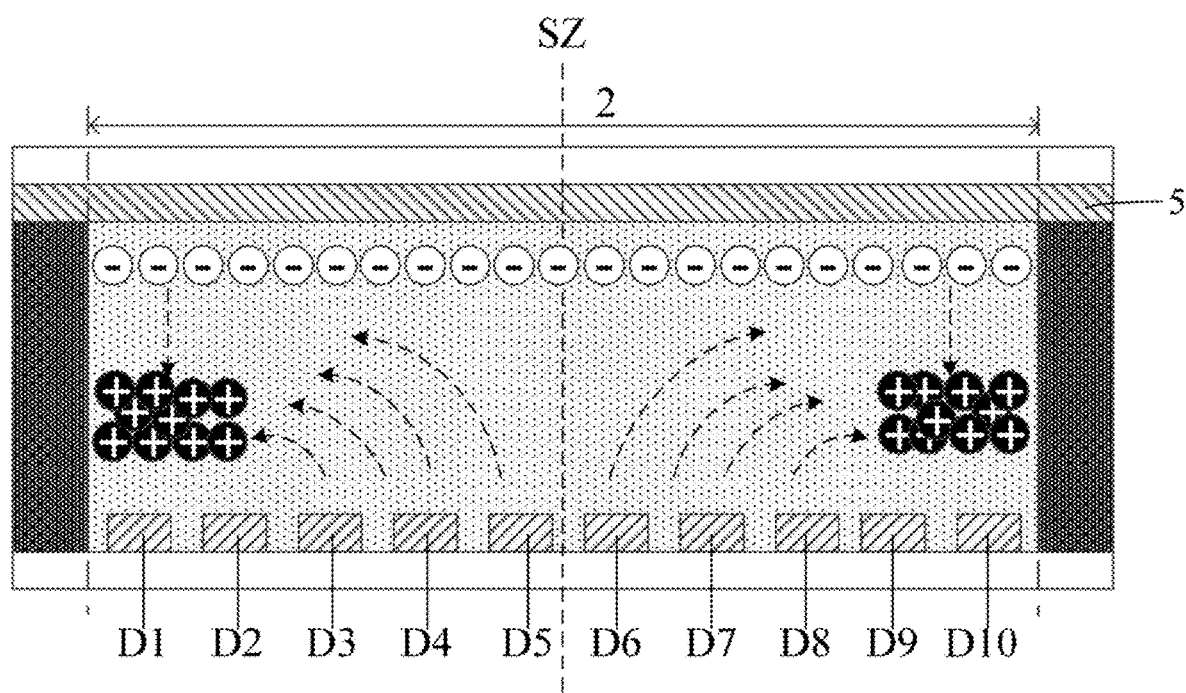
FIG. 17 is a schematic diagram of a structure of some other yet display panels according to an embodiment of the present disclosure.
Figure 18:
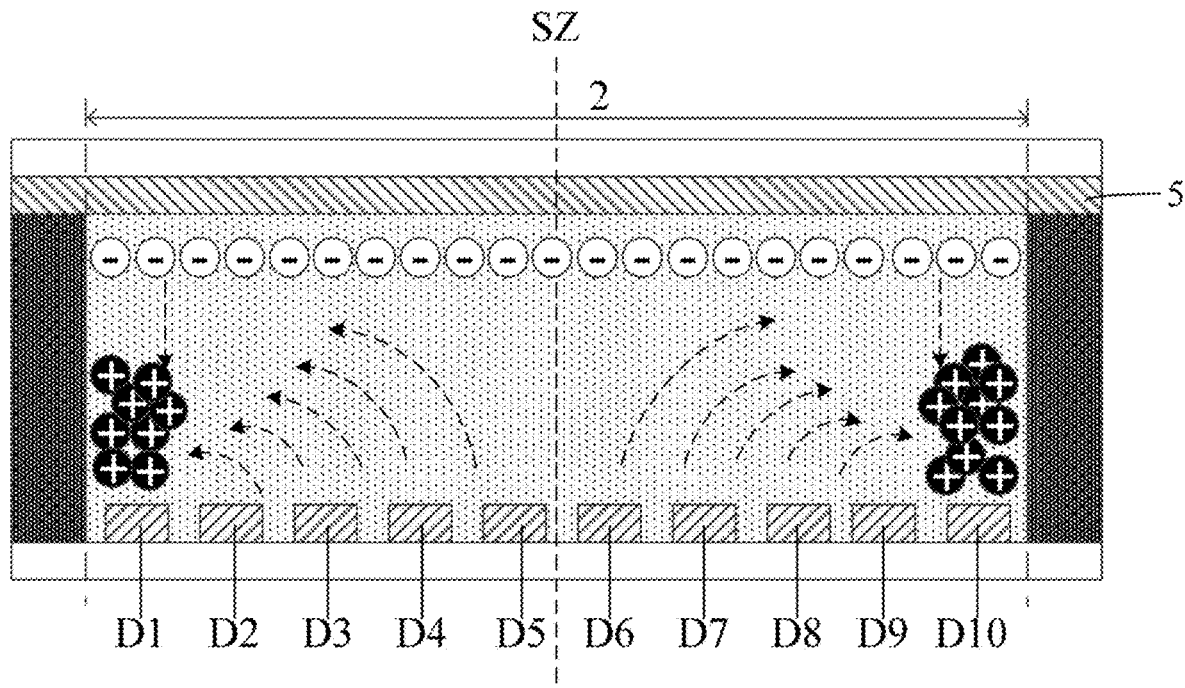
FIG. 18 is a schematic diagram of a structure of some other yet display panels according to an embodiment of the present disclosure.
Figure 19:
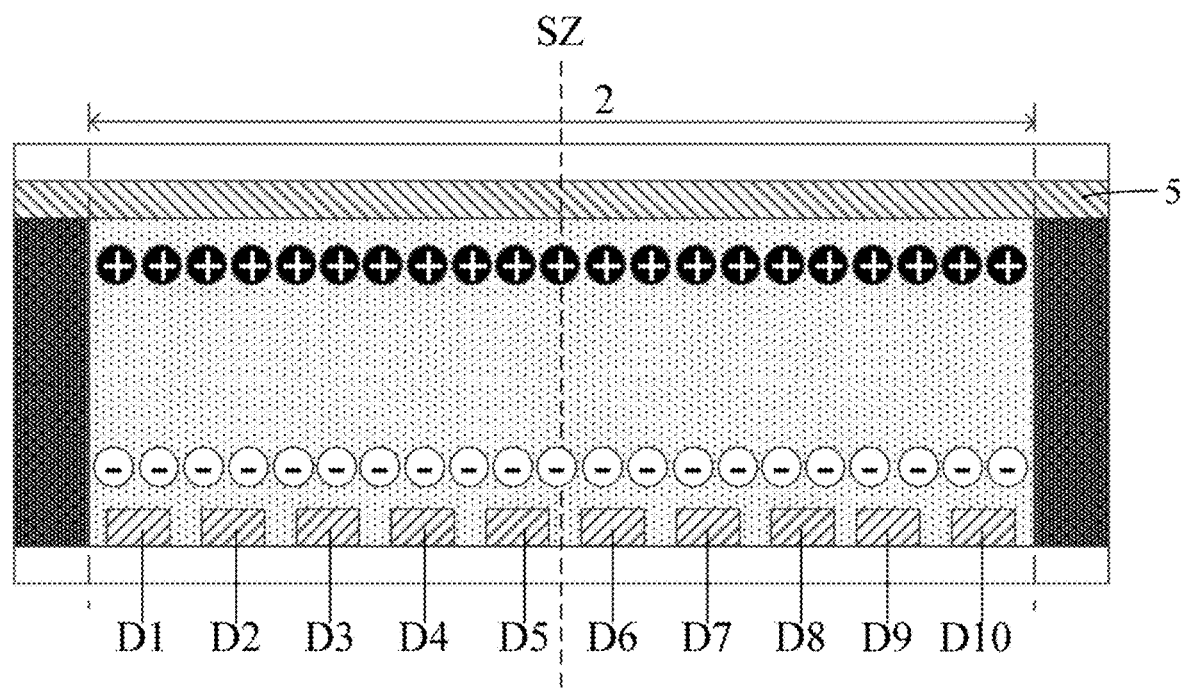
FIG. 19 is a schematic diagram of a structure of some other yet display panels according to an embodiment of the present disclosure.

As shown in FIG. 13, a method for driving a display panel provided in an embodiment of the present disclosure includes the following acts S100 to S300.

In the act S100, first drive voltages with different maintaining durations are loaded to at least part of a plurality of pixel sub-electrodes in a set pixel through a signal output terminal in a picture display stage, so that the set pixel is switched from a first state to a second state; wherein the set pixel is at least one of a plurality of pixels.

In the act S200, first drive voltages with different maintaining durations are loaded to at least part of the plurality of pixel sub-electrodes in the set pixel through the signal output terminal while the second state is maintained, in the picture display stage.

In the act S300, in the picture display stage the set pixel is switched from the second state to the first state by loading a second drive voltage for a same maintaining duration to the plurality of pixel sub-electrodes in the set pixel through the signal output terminal.

As an example, the method for driving a display device provided in the embodiment of the present disclosure is described with reference to signal timing diagrams shown in FIGS. 8 and 12, and with reference to FIGS. 14 to 19. Directions pointed by dashed arrows in FIGS. 14 to 18 are electric field directions. Taken one pixel as an example, FA represents a display frame, TX represents a picture display stage, gal represents a signal transmitted on a gate line GA1, da1 represents a signal input to the data input terminal DA of the first drive circuit 211, da2 represents a signal input to the data input terminal DA of the second drive circuit 212, da3 represents a signal input to the data input terminal DA of the third drive circuit 213, da4 represents a signal input to the data input terminal DA of the fourth drive circuit 214, da5 represents a signal input to the data input terminal DA of the fifth drive circuit 215, sp1 represents a signal of the first ramp signal terminal SP1, and sp2 represents a signal of the second ramp signal terminal SP2.

An example is taken for description by a case where the black charged particles 601 are positive particles, and the white charged particles 602 are negative particles, the first drive voltage is −5V, and the second drive voltage is 5V.

After the set pixel is switched from the black state to the white state, taking the first drive unit Z1 as an example, a data voltage Vda1 (e.g. −4V) is input to the data input terminal DA of the first drive circuit 211, then the first drive voltage (e.g. −vdd) at the second power supply terminal VDD2 is input to the first node N1, and the signal sp2 of the second ramp signal terminal SP2 is input to the second node N2. The data voltage Vda1 (e.g. −4V) is compared with the voltage (e.g. −5V to 0V) of the signal sp2, and the comparator BJQ outputs a signal z1 to the signal output terminal VD. The conducting transistor M1 is turned on under the control of the high level of the signal gal, and the signal z1 is provided to the pixel sub-electrodes D5 and D6 in the first drive unit Z1.

Taking the fourth drive unit Z4 as an example, a data voltage Vda4 (e.g. −2V) is input to the data input terminal DA of the fourth drive circuit 214, then the first drive voltage at the second power supply terminal VDD2 is input to the first node N1, and the signal sp2 of the second ramp signal terminal SP2 is input to the second node N2. The data voltage Vda4 (e.g. −2V) is compared with the voltage (e.g. −5V to 0V) of the signal sp2, and the comparator BJQ outputs a signal z4 to the signal output terminal VD. The conducting transistor M1 is turned on under the control of the high level of the signal gal, and the signal z4 is provided to the pixel sub-electrodes D2 and D9 in the fourth drive unit Z4.

A process for the second drive unit Z2 to load the signal z2, a process for the third drive unit Z3 to load the signal z3, and a process for the fifth drive unit Z5 to load the signal z5 may be deduced similarly, which are not repeated herein.

In a time stage t01, a first drive voltage of −5V is loaded to the pixel sub-electrodes D5 and D6 in the first drive unit Z1, the pixel sub-electrodes D4 and D7 in the second drive unit Z2, the pixel sub-electrodes D3 and D8 in the third drive unit Z3, the pixel sub-electrodes D2 and D9 in the fourth drive unit Z4, and the pixel sub-electrodes D1 and D10 in the fifth drive unit Z5. Under an action of the electric field, a plurality of white charged particles are tiled near the common electrode 5, and a plurality of black charged particles are tiled near the pixel sub-electrodes D1 to D10, so that the set pixel is in the white state.

In a time stage t02, a voltage of 0V is loaded to the pixel sub-electrodes D5 and D6 in the first drive unit Z1, and the first drive voltage of −5V is loaded to the pixel sub-electrodes D4 and D7 in the second drive unit Z2, the pixel sub-electrodes D3 and D8 in the third drive unit Z3, the pixel sub-electrodes D2 and D9 in the fourth drive unit Z4, and the pixel sub-electrodes D1 and D10 in the fifth drive unit Z5. Under the action of the electric field, a plurality of white charged particles are tiled near the common electrode 5, and a plurality of black charged particles near the pixel sub-electrodes D5 and D6 move to both sides, thereby improving a reflectivity of the set pixel and improving the white state display effect of the set pixel.

In a time stage t03, the voltage of 0V is loaded to the pixel sub-electrodes D5 and D6 in the first drive unit Z1 and the pixel sub-electrodes D4 and D7 in the second drive unit Z2, and the first drive voltage of −5V is loaded to the pixel sub-electrodes D3 and D8 in the third drive unit Z3, the pixel sub-electrodes D2 and D9 in the fourth drive unit Z4, and the pixel sub-electrodes D1 and D10 in the fifth drive unit Z5. Under the action of the electric field, a plurality of white charged particles are tiled near the common electrode 5, and a plurality of black charged particles near the pixel sub-electrodes D4 and D7 move to both sides, further improving a reflectivity of the set pixel and improving the white state display effect of the set pixel.

In a time stage t04, the voltage of 0V is loaded to the pixel sub-electrodes D5 and D6 in the first drive unit Z1, the pixel sub-electrodes D4 and D7 in the second drive unit Z2, and the pixel sub-electrodes D3 and D8 in the third drive unit Z3, and the first drive voltage of −5V is loaded to the pixel sub-electrodes D2 and D9 in the fourth drive unit Z4, and the pixel sub-electrodes D1 and D10 in the fifth drive unit Z5. Under the action of the electric field, a plurality of white charged particles are tiled near the common electrode 5, and a plurality of black charged particles near the pixel sub-electrodes D3 and D8 move to both sides, further improving a reflectivity of the set pixel and improving the white state display effect of the set pixel.

In a time stage t05, the voltage of 0V is loaded to the pixel sub-electrodes D5 and D6 in the first drive unit Z1, the pixel sub-electrodes D4 and D7 in the second drive unit Z2, the pixel sub-electrodes D3 and D8 in the third drive unit Z3, and the pixel sub-electrodes D2 and D9 in the fourth drive unit Z4, and the first drive voltage of −5V is loaded to the pixel sub-electrodes D1 and D10 in the fifth drive unit Z5. Under the action of the electric field, a plurality of white charged particles are tiled near the common electrode 5, and a plurality of black charged particles near the pixel sub-electrodes D2 and D9 move to both sides, further improving a reflectivity of the set pixel and improving the white state display effect of the set pixel.

After the set pixel is changed from the white state to the black state, taking the first drive unit Z1 as an example, the data voltage Vda1 (e.g. 5V) is input to the data input terminal DA of the first drive circuit 211, then the second drive voltage (e.g. vdd) at the first power supply terminal VDD1 is input to the first node N1, and the signal sp1 of the first ramp signal terminal SP1 is input to the second node N2. The data voltage Vda1 (e.g. 5V) is compared with the voltage (e.g. 0V to 5V) of the signal sp2, and the comparator BJQ outputs the signal z1' to the signal output terminal VD. The conducting transistor M1 is turned on under the control of the high level of the signal gal, and the signal z1' is provided to the pixel sub-electrodes D5 and D6 in the first drive unit Z1.

Taking the fourth drive unit Z4 as an example, the data voltage Vda4 (e.g. 5V) is input to the data input terminal DA of the fourth drive circuit 214, then the second drive voltage (e.g. vdd) at the first power supply terminal VDD1 is input to the first node N1, and the signal sp1 of the first ramp signal terminal SP1 is input to the second node N2. The data voltage Vda4 (e.g. 5V) is compared with the voltage (e.g. 0V to 5V) of the signal sp2, and the comparator BJQ outputs the signal z4' to the signal output terminal VD. The conducting transistor M1 is turned on under the control of the high level of the signal gal, and the signal z4' is provided to the pixel sub-electrodes D2 and D9 in the fourth drive unit Z4.

A process for the second drive unit Z2 to load the signal z2', a process for the third drive unit Z3 to load the signal z3', and a process for the fifth drive unit Z5 to load the signal z5' may be deduced similarly, which are not repeated herein.

Thus, under the action of the electric field, a plurality of black charged particles are tiled near the common electrode 5, and a plurality of white charged particles are tiled near the pixel sub-electrodes D1 to D10, so that the set pixel is in the black state.

Figure 20:
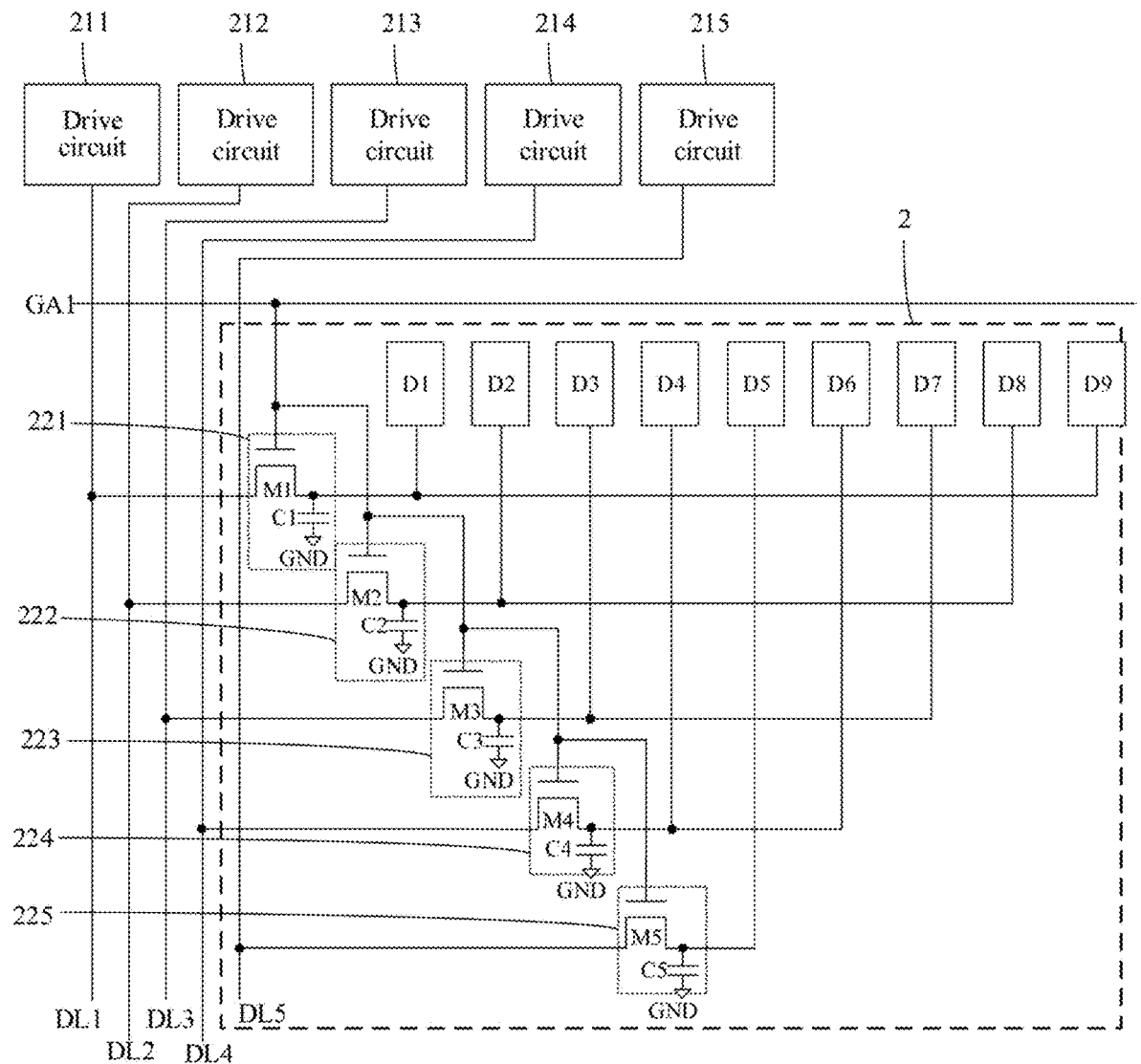
FIG. 20 is a schematic diagram of a structure of some other yet display panels according to an embodiment of the present disclosure.

Schematic diagrams of some structures of the display panel are provided in embodiments of the present disclosure. Variation is performed on the implementations in the above embodiments, as shown in FIG. 20. Only differences between this embodiment and the above-described embodiments will be described below, and the same will not be repeated herein.

In some embodiments of the present disclosure, a pixel electrode includes an odd number of sub-electrode groups, wherein the pixel further includes an (N+1)-th switch control circuit, and each column of pixels further corresponds to an (N+1)-th drive circuit of the plurality of drive circuits. In each column of pixels, a sub-electrode group on the symmetry axis SZ is coupled to the (N+1)-th drive circuit through the (N+1)-th switch control circuit. A maintaining duration of a drive voltage corresponding to a sub-electrode group on the symmetry axis SZ is smaller than a maintaining duration of a drive voltage corresponding to the first drive unit.

As an example, the pixel electrode includes 3 sub-electrode groups, 5 sub-electrode groups, 7 sub-electrode groups, 9 sub-electrode groups, or more sub-electrode groups, which is not limited herein.

Figure 21:
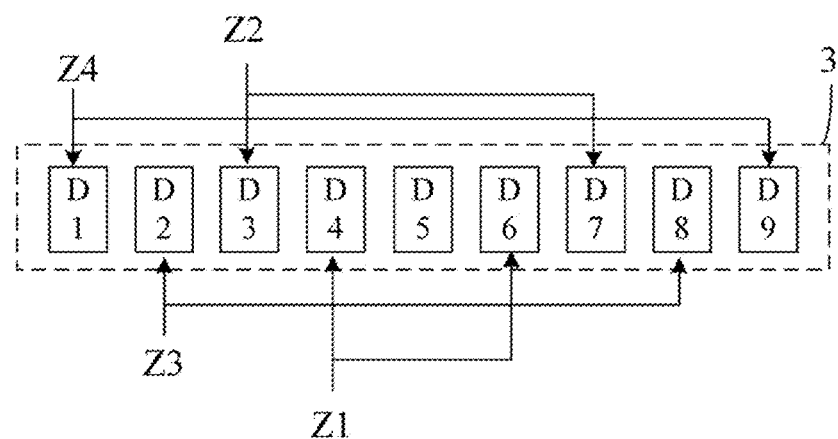
FIG. 21 is a schematic diagram of a structure of some other yet pixel sub-electrodes according to an embodiment of the present disclosure.

As an example, as shown in FIGS. 20 and 21, taking each sub-electrode group including one pixel sub-electrode as an example, the pixel electrode may include nine sub-electrode groups that may be divided into four drive units, i.e., the drive units Z1 to Z4. The first drive unit Z1 includes the pixel sub-electrodes D4 and D6, the second drive unit Z2 includes the pixel sub-electrodes D3 and D7, the third drive unit Z3 includes the pixel sub-electrodes D2 and D8, and the fourth drive unit Z4 includes the pixel sub-electrodes D1 and D9.

The first drive unit Z1 corresponds to the conducting transistor M1, the capacitor C1 and the first drive circuit 211. The second drive unit Z2 corresponds to the conducting transistor M2, the capacitor C2 and the second drive circuit 212. The third drive unit Z3 corresponds to the conducting transistor M3, the capacitor C3 and the third drive circuit 213. The fourth drive unit Z4 corresponds to the conducting transistor M4 and the capacitor C4 and the fourth drive circuit 214. Implementations of the first drive unit Z1 to the fourth drive unit Z4 may refer to the implementations described in the above-mentioned embodiments, which are not be described herein.

As an example, as shown in FIGS. 20 and 21, the pixel further includes the fifth switch control circuit 225, and each column of pixels further corresponds to the fifth drive circuit 215 of a plurality of drive circuits. In each column of pixels, the sub-electrode group on the symmetry axis SZ is coupled to the fifth drive circuit through the fifth switch control circuit. A maintaining duration of a drive voltage corresponding to a sub-electrode group on the symmetry axis SZ is smaller than a maintaining duration of a drive voltage corresponding to the first drive unit.

For example, as shown in FIGS. 8, 20 and 21, z1 represents a signal loaded to the pixel sub-electrode D4 and the pixel sub-electrode D6 in the first drive unit Z1 after the first state is switched to the second state, z2 represents a signal loaded to the pixel sub-electrode D3 and the pixel sub-electrode D7 in the second drive unit Z2 after the first state is switched to the second state, z3 represents a signal loaded to the pixel sub-electrode D2 and the pixel sub-electrode D8 in the third drive unit Z3 after the first state is switched to the second state, z4 represents a signal loaded to the pixel sub-electrode D1 and the pixel sub-electrode D9 in the fourth drive unit Z4 after the first state is switched to the second state, and z5 represents a signal loaded to the pixel sub-electrode D5 after the first state is switched to the second state, wherein vcom represents a common electrode voltage, and −vdd represents a first drive voltage loaded to each of the pixel sub-electrodes. A maintaining duration t11 of the first drive voltage −vdd loaded to the first drive unit Z1, a maintaining duration t12 of the first drive voltage −vdd loaded to the second drive unit Z2, a maintaining duration t13 of the first drive voltage −vdd loaded to the third drive unit Z3, a maintaining duration t14 of the first drive voltage −vdd loaded to the fourth drive unit Z4, and a maintaining duration t15 of the first drive voltage −vdd loaded to the pixel sub-electrode D5 are different, wherein t11<t12<t13<t14<t15.

An operation process of the display device may refer to the operation process of the display device in the above-mentioned embodiments, which is not repeated herein.

Apparently, various modifications and variations to the embodiments of the present disclosure may be made by those skilled in the art without departing from the spirit and scope of the embodiments of the present disclosure. Thus, if these modifications and variations to the embodiments of the present disclosure fall within the scope of the claims of the present disclosure and their equivalent techniques, the present disclosure is intended to include these modifications and variations.

The invention claimed is:

1. A display device, comprising:
a display panel, comprising a plurality of pixels, wherein each of the plurality of pixels comprises a pixel electrode, and the pixel electrode comprises a plurality of pixel sub-electrodes spaced from each other; and
a drive circuit, configured to, in a picture display stage, load first drive voltages with different maintaining durations to at least part of a plurality of pixel sub-electrodes in a set pixel through a signal output terminal, to switch the set pixel from a first state to a second state; wherein the set pixel is at least one of the plurality of pixels.

2. The display device of claim 1, wherein the drive circuit is further configured to, in the picture display stage, load first drive voltages with different maintaining durations to at least part of the plurality of pixel sub-electrodes in the set pixel through the signal output terminal when the second state is maintained.

3. The display device of claim 1, wherein the plurality of pixel sub-electrodes of the pixel electrode are divided into a plurality of sub-electrode groups, wherein each sub-electrode group of the plurality of sub-electrode groups comprises at least one pixel sub-electrode; the pixel electrode has a symmetry axis in a column direction of pixels, and the plurality of sub-electrode groups in the pixel electrode are symmetrical about the symmetry axis; the plurality of sub-electrode groups are divided into N drive units, each of the drive units comprises two sub-electrode groups disposed symmetrically.

4. The display device of claim 3, wherein the drive circuit is further configured to load a first drive voltage with a same maintaining duration to sub-electrode groups in a same drive unit, and load first drive voltages with different maintaining durations to sub-electrode groups in different drive units, in the set pixel.

5. The display device of claim 4, wherein the N drive units are defined as a first drive unit to an N-th drive unit in a direction from a drive unit close to the symmetry axis to a drive unit away from the symmetry axis; and
the drive circuit is further configured to sequentially increase maintaining durations of first drive voltages loaded from the first drive unit to the N-th drive unit in the set pixel.

6. The display device of claim 3, wherein the N drive units are defined as a first drive unit to an N-th drive unit in a direction from a drive unit close to the symmetry axis to a drive unit away from the symmetry axis; and
the drive circuit is further configured to sequentially increase maintaining durations of first drive voltages loaded from the first drive unit to the N-th drive unit in the set pixel.

7. The display device of claim 3, wherein there are a plurality of drive circuits, wherein each column of pixels corresponds to N drive circuits of the plurality of drive circuits;
the pixel further comprises N switch control circuits; an n-th drive unit of each column of pixels is coupled to a signal output terminal of an n-th drive circuit of the N drive circuits by an n-th switch control circuit of the N switch control circuits;
the switch control circuit is configured to make a signal output terminal of a corresponding drive circuit be conductive with a corresponding drive unit under control of a signal of a scanning signal terminal.

8. The display device of claim 7, wherein the switch control circuit comprises a conducting transistor;
a gate of the conducting transistor is coupled to the scanning signal terminal, a first electrode of the conducting transistor is coupled to the signal output terminal, and a second electrode of the conducting transistor is coupled to the drive unit.

9. The display device of claim 8, wherein the switch control circuit comprises a capacitor;
a first electrode of the capacitor is coupled to the second electrode of the conducting transistor, and a second electrode of the capacitor is coupled to the ground terminal.

10. The display device of claim 7, wherein the drive circuit comprises a first control sub-circuit, a second control sub-circuit and a third control sub-circuit;
the first control sub-circuit is coupled to a first node and configured to provide a signal of a first power supply terminal to the first node when a data voltage at a data input terminal is higher than a set voltage, and to provide a signal of a second power supply terminal to the first node when the data voltage at the data input terminal is lower than the set voltage;
the second control sub-circuit is coupled to a second node and configured to provide a signal of a first ramp signal terminal to the second node when the data voltage at the data input terminal is higher than the set voltage, and to provide a signal of a second ramp signal terminal to the second node when the data voltage at the data input terminal is lower than the set voltage; and
the third control sub-circuit is coupled to the first node and the second node, and is configured to output the first drive voltage to the signal output terminal according to the data voltage at the data input terminal, a voltage of a signal of the first node, and a voltage of a signal of the second node.

11. The display device of claim 10, wherein the first control sub-circuit comprises a first transistor and a second transistor;
a gate of the first transistor is coupled to the data input terminal, a first electrode of the first transistor is coupled to the first power supply terminal, and a second electrode of the first transistor is coupled to the first node; and
a gate of the second transistor is coupled to the data input terminal, a first electrode of the second transistor is coupled to the first node, and a second electrode of the second transistor is coupled to the second power supply terminal.

12. The display device of claim 10, wherein the second control sub-circuit comprises a third transistor and a fourth transistor;
   a gate of the third transistor is coupled to the data input terminal, a first electrode of the third transistor is coupled to the first ramp signal terminal, and a second electrode of the third transistor is coupled to the second node; and
   a gate of the fourth transistor is coupled to the data input terminal, a first electrode of the fourth transistor is coupled to the second node, and a second electrode of the fourth transistor is coupled to the second ramp signal terminal.

13. The display device of claim 10, wherein the third control sub-circuit comprises a comparator;
   a first input terminal of the comparator is coupled to the data signal terminal, a second input terminal of the comparator is coupled to the second node, a third input terminal of the comparator is coupled to the first node, a fourth input terminal of the comparator is coupled to a ground terminal, and an output terminal of the comparator is coupled to the signal output terminal.

14. The display device of claim 7, wherein the display panel further comprises a plurality of scanning signal lines and a plurality of data signal lines;
   a scanning signal terminal of a switch control circuit in each row of pixels is coupled to one of the plurality of scanning signal lines; and
   an n-th switch control circuit in each column of pixels is coupled to a signal output terminal of an n-th drive circuit through one of the plurality of data signal lines.

15. The display device of claim 3, wherein the pixel electrode comprises an even number of sub-electrode groups;
   or the pixel electrode comprises an odd number of sub-electrode groups, wherein the pixel further comprises an (N+1)-th switch control circuit, and each column of pixels further corresponds to an (N+1)-th drive circuit of the plurality of drive circuits; in each column of pixels, a sub-electrode group on the symmetry axis is coupled to the (N+1)-th drive circuit through the (N+1)-th switch control circuit; a maintaining duration of a first drive voltage corresponding to a sub-electrode group on the symmetry axis is smaller than the maintaining duration of the first drive voltage corresponding to the first drive unit.

16. The display device of claim 1, wherein the drive circuit is further configured to, in the picture display stage, load a second drive voltage with a same maintaining duration to the plurality of pixel sub-electrodes in the set pixel through the signal output terminal, to switch the set pixel from the second state to the first state.

17. The display device of claim 1, wherein the display panel is an electronic paper display panel, and the display panel further comprises a first base substrate;
   each of the plurality of pixels further comprises:
      a common electrode, located on a side of the pixel electrode away from the first base substrate; and
      an electrophoretic liquid layer, located between the pixel electrode and the common electrode, wherein the electrophoretic liquid layer comprises a plurality of charged particles;
   wherein the pixel sub-electrode is configured to drive the plurality of charged particles to adjust gray scale display.

18. A method for driving the display device of claim 1, comprising:
   loading first drive voltages with different maintaining durations to at least part of a plurality of pixel sub-electrodes in a set pixel through a signal output terminal in a picture display stage, to switch the set pixel from a first state to a second state; wherein the set pixel is at least one of the plurality of pixels.

19. The method for driving the display device of claim 18, further comprising: loading first drive voltages with different maintaining durations to at least part of the plurality of pixel sub-electrodes in the set pixel through the signal output terminal when the second state is maintained, in the picture display stage.

20. The method for driving the display device of claim 18, further comprising: loading a second drive voltage with a same maintaining duration to the plurality of pixel sub-electrodes in the set pixel through the signal output terminal, to switch the set pixel from the second state to the first state, in the picture display stage.

* * * * *